United States Patent
Tanaka et al.

(10) Patent No.: US 6,535,677 B1
(45) Date of Patent: Mar. 18, 2003

(54) DISPERSION-MANAGED OPTICAL FIBER, METHOD OF MANUFACTURING THE SAME, OPTICAL COMMUNICATION SYSTEM INCLUDING THE SAME AND OPTICAL FIBER PREFORM THEREFOR

(75) Inventors: Shigeru Tanaka, Yokohama (JP); Masayuki Nishimura, Yokohama (JP); Shinji Ishikawa, Yokohama (JP); Eisuke Sasaoka, Yokohama (JP); Takatoshi Kato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 186 days.

(21) Appl. No.: 09/668,347

(22) Filed: Sep. 25, 2000

(30) Foreign Application Priority Data

Sep. 27, 1999 (JP) .......................... 11-272694

(51) Int. Cl.[7] .............................. G02B 6/02
(52) U.S. Cl. .................. 385/123; 385/126; 385/127
(58) Field of Search ............................ 385/123–128

(56) References Cited

U.S. PATENT DOCUMENTS

| | | | |
|---|---|---|---|
| 5,267,339 A | | 11/1993 | Yamauchi et al. |
| 5,483,612 A | * | 1/1996 | Gallagher et al. .......... 385/124 |
| 5,778,128 A | | 7/1998 | Wildeman |
| 5,894,537 A | | 4/1999 | Berkey et al. |
| 6,044,191 A | * | 3/2000 | Berkey et al. ............. 385/123 |
| 6,389,207 B1 | * | 5/2002 | Berkey ....................... 385/124 |
| 2001/0008077 A1 | * | 7/2001 | Berkey ......................... 162/51 |
| 2002/0041747 A1 | * | 4/2002 | Tirloni et al. .............. 385/123 |

FOREIGN PATENT DOCUMENTS

| | | |
|---|---|---|
| EP | 0737873 | 10/1996 |
| EP | 0902308 | 3/1999 |
| GB | 2105488 | 3/1983 |
| JP | 62-080607 | 4/1987 |
| JP | 62-291605 | 12/1987 |
| JP | 63-208003 | 8/1988 |
| JP | 01-298037 | 12/1989 |
| JP | 05-155639 | 6/1993 |
| JP | 08-201639 | 8/1996 |
| JP | 10-167750 | 6/1998 |
| JP | 11-021142 | 1/1999 |
| JP | 11-030725 | 2/1999 |

OTHER PUBLICATIONS

Y. Park, K. Oh, U.C. Paek, D.Y. Kim, and Charles R. Kurkjian, Residual Stresses in a Doubly Clad Fiber With Depressed Inner Cladding (DIC). Journal of Lightwave Technology, vol. 17, No. 10, Oct. 1999, pp. 1823–1834.
T. Nozawa, T. Sakai, A. Wada, and R. Yamauchi, "Supression of Stimulated Brillouin Scattering by Intentionally Induced Periodical Residual –Strain in Single–Mode Optical Fibers," Fujikura Ltd., pp. 4–6.

\* cited by examiner

*Primary Examiner*—Rodney Bovernick
*Assistant Examiner*—Sung Pak
(74) *Attorney, Agent, or Firm*—McDermott, Will & Emery

(57) ABSTRACT

The present invention relates to a dispersion-managed optical fiber which can be manufactured easily and has a structure which enables the easy connection thereof with other optical fiber and the like. The dispersion-managed optical fiber is a silica-based optical fiber ensuring its single mode at a predetermined wavelength within a signal wavelength band, in which first portions each having a positive chromatic dispersion and second portions each having a negative chromatic dispersion are arranged alternately and adjacent to each other. In the dispersion-managed optical fiber, the dopant concentration is made uniform in the longitudinal direction and, corresponding to the above-mentioned first and second portions, the refractive index of a glass layer not doped with $GeO_2$ as a dopant is adjusted or the residual stresses in glass layers are changed.

77 Claims, 19 Drawing Sheets

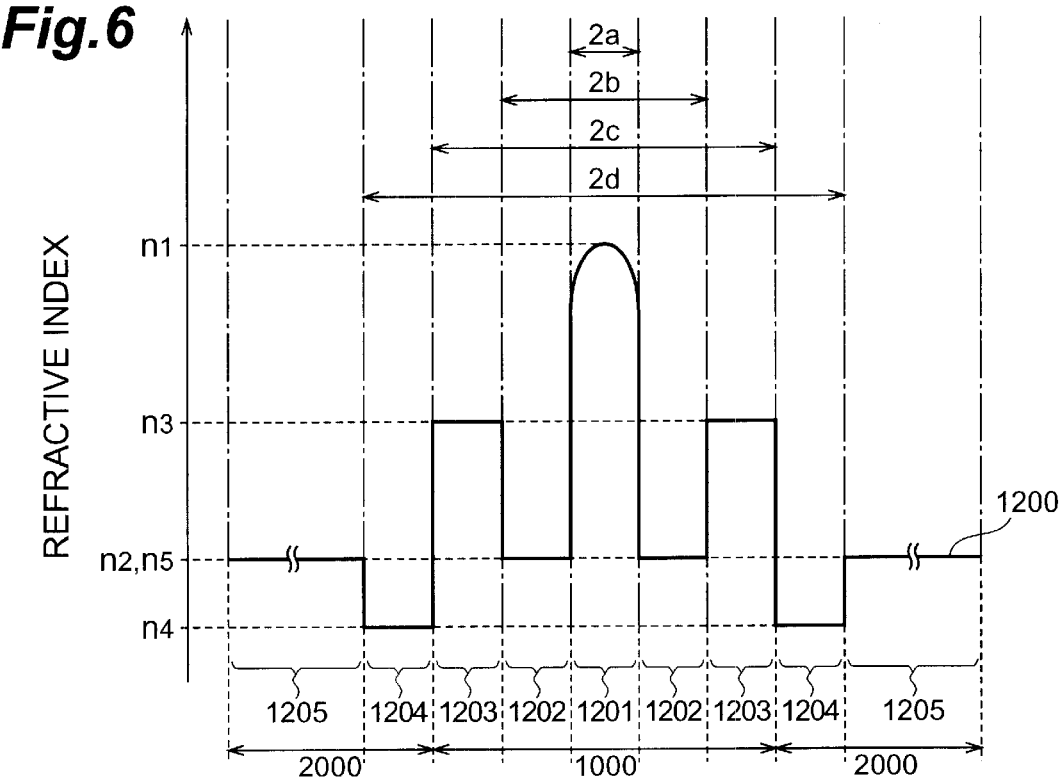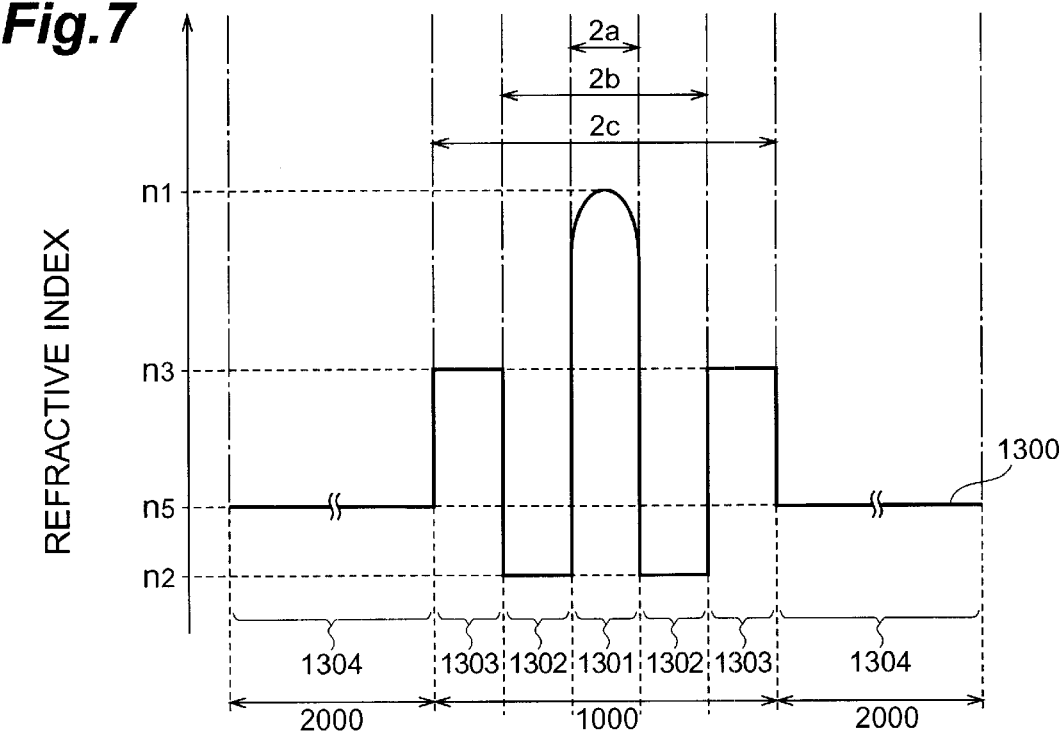

Fig.19

| SAMPLE | | | 1 | 2 | 3 | 4 | 5 | 6 | 7 |
|---|---|---|---|---|---|---|---|---|---|
| CORE STRUCTURE | | | MULTI-CORE | MULTI-CORE | MULTI-CORE | MULTI-CORE | DOUBLE CORE | DOUBLE CORE | W-TYPE |
| CLADDING STRUCTURE | | | MATCHED | DEPRESSED | MATCHED | DEPRESSED | MATCHED | DEPRESSED | |
| TENSION | | (g) | 40 | 60 | 30 | 40 | 30 | 40 | 40 |
| FIRST CORE | REFRACTIVE INDEX CONSTRAST | (%) | 0.63 | 0.47 | 0.90 | 0.64 | 0.95 | 0.86 | 0.59 |
| | OUTER DIAMETER | (μm) | 8.1 | 6.0 | 4.9 | 6.8 | 4.3 | 4.4 | 5.3 |
| SECOND CORE | REFRACTIVE INDEX CONSTRAST | (%) | −0.25 | −0.18 | 0 | 0 | 0.20 | 0.16 | — |
| | OUTER DIAMETER | (μm) | 15.8 | 17.5 | 8.7 | 17.4 | 18.0 | 22.8 | — |
| THIRD CORE | REFRACTIVE INDEX CONSTRAST | (%) | 0.22 | 0.28 | 0.33 | 0.20 | — | — | — |
| | OUTER DIAMETER | (μm) | 22.6 | 25.0 | 13.6 | 27.2 | — | — | — |
| INNER CLADDING | REFRACTIVE INDEX CONSTRAST | (%) | — | −0.18 | — | −0.10 | — | −0.05 | −0.13 |
| | OUTER DIAMETER | (μm) | — | 50.0 | — | 40.8 | — | 34.0 | 11.0 |
| CHROMATIC DISPERSION | (MEASURED WAVELENGTH) 1.53 μm | (ps/nm/km) | −2.18 | −2.39 | −9.71 | −5.31 | −9.20 | −7.30 | −3.69 |
| | 1.54 μm | (ps/nm/km) | −2.49 | −2.56 | −6.99 | −4.88 | −8.30 | −6.43 | −3.38 |
| | 1.56 μm | (ps/nm/km) | −3.29 | −2.88 | −5.18 | −3.91 | −6.50 | −4.68 | −2.77 |
| | 1.60 μm | (ps/nm/km) | −5.41 | −3.24 | −1.55 | −1.54 | −2.90 | −1.18 | −1.54 |
| DISPERSION SLOPE | 1.55 μm | (ps/nm²/km) | −0.043 | −0.015 | 0.091 | 0.050 | 0.090 | 0.087 | 0.030 |
| EFFECTIVE AREA | 1.55 μm | (μm²) | 43.4 | 52.1 | 50.4 | 64.3 | 51.3 | 54.8 | 57.1 |
| CUT-OFF WAVELENGTH | | (μm) | 1.40 | 1.54 | 0.90 | 1.85 | 0.82 | 0.76 | 0.94 |
| MACROBEND LOSS (DIAMETER 20mm) | 1.55 μm | (dB/m) | 9.8 | 0.08 | 4.0 | 0.2 | 5.0 | 2.0 | 1.8 |
| PMD | 1.55 μm | (ps·km⁻¹ᐟ²) | 0.08 | 0.06 | 0.07 | 0.07 | 0.08 | 0.06 | 0.11 |
| MEAN CHROMATIC DISPERSION | 1.53 μm | (ps/nm/km) | 1.07 | 0.13 | −4.27 | −1.09 | −3.94 | −3.13 | −0.64 |
| | 1.54 μm | (ps/nm/km) | 0.99 | 0.07 | −2.30 | −0.60 | −2.98 | −2.18 | −0.31 |
| | 1.56 μm | (ps/nm/km) | 0.67 | −0.08 | −0.24 | 0.43 | −1.08 | −0.29 | 0.36 |
| | 1.60 μm | (ps/nm/km) | −0.42 | −0.27 | 3.76 | 2.69 | 2.66 | 3.44 | 1.65 |

TO GUIDE ROLLER 731

US 6,535,677 B1

DISPERSION-MANAGED OPTICAL FIBER, METHOD OF MANUFACTURING THE SAME, OPTICAL COMMUNICATION SYSTEM INCLUDING THE SAME AND OPTICAL FIBER PREFORM THEREFOR

BACKGROUND OF THE INVENTION

1. Field of the Invention

The present invention relates to an optical fiber suitable for transmitting signals of a plurality of channels, a method of manufacturing the same, an optical communication system including the same and an optical fiber preform for obtaining the same in a wavelength division multiplexing (WDM) transmission.

2. Related Background Art

The WDM transmission system is an optical communication system which can realize a high-speed optical communication of a large capacity by transmitting signals of a plurality of channels. In the WDM transmission system, since the transmission loss of a silica-based optical fiber applied to an optical transmission line becomes small in the vicinity of the wavelength of 1.55 μm and an optical amplifier which amplifies signals at the wavelength band of 1.55 μm has been practically used, signals of a plurality of channels included in the wavelength band of 1.55 μm are available.

In the optical transmission line through which signals of a plurality of channels propagate, it is known that when the chromatic dispersion is generated at the signal wavelength band (the wavelength band of 1.55 μm), the pulse waveform of respective signals becomes broadened so that the transmission characteristics is deteriorated. Accordingly, from this point of view, it is desirable that the chromatic dispersion within the signal wavelength band is small. On the other hand, when the chromatic dispersion value within the signal wavelength band is approximately zero, a four-wave mixing which is one of the nonlinear optical phenomena is liable to be generated and hence, crosstalks and noises caused by the four-wave mixing are generated thus deteriorating the transmission characteristics. To suppress the generation of the four-wave mixing, the power of signals propagating through the optical transmission line may be reduced by making the repeater spacing short. However, it becomes necessary to install a large number of optical amplifiers along the whole optical transmission line thus pushing up a cost of the optical communication system as a whole.

To make the repeater spacing long while suppressing the occurrence of the above-mentioned nonlinear optical phenomenon, a dispersion-managed optical fiber in which portions having a positive chromatic dispersion and portions having a negative chromatic dispersion are alternately arranged, at a predetermined wavelength (for example, the wavelength being 1.55 μm=1550 nm), has been proposed. In the optical transmission line which has adopted such a dispersion-managed optical fiber, the mean chromatic dispersion (at the wavelength of 1.55 μm) from the viewpoint of the whole optical transmission line becomes approximately zero and hence, the deterioration of transmission characteristics caused by the generation of the chromatic dispersion can be effectively suppressed. Further, since the chromatic dispersion is generated in substantially all regions of the optical transmission line, the deterioration of transmission characteristics caused by the four-wave mixing can be effectively suppressed.

For example, Japanese parent Laid-open No. 201639/1996 discloses a dispersion-managed optical fiber which changes a sign (positive or negative) of the chromatic dispersion by changing the outer diameter of a core in the longitudinal direction. This publication also discloses a method of manufacturing such a dispersion-managed optical fiber. U.S. Pat. No. 5,894,537 discloses a dispersion-managed optical fiber which is designed such that signs (positive and negative) of the chromatic dispersions which are generated at respective portions are made different by changing the outer diameter of a core or the outer diameter of a cladding in the longitudinal direction, and it also discloses a method of manufacturing such a dispersion-managed optical fiber. The Japanese Patent Laid-open No. 318824/1997 discloses an optical fiber cable in which two kinds of optical fibers which differ from each other in their effective areas as well as in signs (positive and negative) of the chromatic dispersion are connected.

SUMMARY OF THE INVENTION

Upon reviewing the conventional dispersion-managed optical fiber and cable, the inventors of the present invention have found following problems. That is, the conventional dispersion-managed optical fiber disclosed in the Japanese Patent Laid-open No. 201639/1996 and U.S. Pat. No. 5,894,537 is manufactured by drawing the optical fiber preform which changes the outer diameter of the core or the outer diameter of the cladding along the longitudinal direction and hence, the manufacturing is not easy. Further, in the conventional dispersion-managed optical fiber, since the outer diameter of the core or the outer diameter of the cladding is changed along the longitudinal direction, it is difficult to connect this optical fiber with other optical fiber. Further, there arises a case that the connection loss becomes large. For example, the optical fiber cable disclosed in Japanese Patent Laid-open No. 318824/1997 connects two kinds of optical fibers which differ from each other in the effective area and hence, the connection loss becomes large.

The present invention has been made to solve the above-mentioned problems and it is an object of the present invention to provide a dispersion-managed optical fiber having a structure which facilitates the manufacturing thereof and the connection thereof with other optical fiber, a method of manufacturing such a dispersion-managed optical fiber, an optical communication system which adopts the dispersion-managed optical fiber as an optical transmission line, and an optical fiber preform for obtaining the dispersion-managed optical fiber.

A dispersion-managed optical fiber according to the present invention is a silica-based optical fiber ensuring its single mode at a predetermined wavelength within a signal wavelength band, that is, a continuous (including unitary) optical fiber in which one or more first portions having a positive chromatic dispersion at the predetermined wavelength and one or more second portions having a negative chromatic dispersion at the predetermined wavelength are arranged alternately and adjacent to each other.

This dispersion-managed optical fiber includes a plurality of glass layers which are sequentially laminated in a radial direction. Among the plurality of glass layers, a dopant concentration of a glass layer doped with a dopant for adjustment of refractive index is made uniform such that the maximum change along the longitudinal direction of the dispersion-managed optical fiber is not more than 20–30%, and preferably, not more than 10%. Further, a refractive index of a glass layer which does not substantially include $GeO_2$ as a dopant is changed along the longitudinal direction of the dispersion-managed optical fiber. Further, the dispersion-managed optical fiber according to the present invention may have a constitution in which the stresses remaining in the plurality of glass layers may be changed along the longitudinal direction of the dispersion-managed optical fiber. It is preferable that a core region in the dispersion-managed optical fiber includes a layer comprised of non-intentionally-doped glass (hereinafter called "pure silica glass"). This is because that since the viscosity of the pure silica glass layer is greater than that of the glass layer including a dopant, the adjustment of residual stress is facilitated. Further, even when a predetermined amount of $GeO_2$ is added into this pure silica glass layer unintentionally during the manufacturing, the relative refractive index difference of this layer, in which the residual stress is given, with respect to the pure silica glass is restricted to a value lower than the relative refractive index difference of the glass layer into which an amount of $GeO_2$ equal to that of the added $GeO_2$ is added, and therefore the influence of addition of $GeO_2$ can be effectively suppressed. In this specification, the relative refractive index difference of each glass layer to a reference region is given by the equation $(n-n_0)/n_0$ (order being irregular) where n indicates the refractive index of each glass layer and $n_0$ indicates the refractive index of the reference region and they are expressed by percentage. Accordingly, when the pure silica glass is used as the reference, the relative refractive index difference of the glass layer having the lower refractive index than the pure silica glass takes the negative value and the relative refractive index difference of the glass layer having the higher refractive index than the pure silica glass takes the positive value.

As has been described heretofore, in the dispersion-managed optical fiber according to the present invention, the dopant concentration is held in the uniform state along the longitudinal direction of the dispersion-managed optical fiber and the refractive index or the residual stress of the glass layer which is not doped with $GeO_2$ is changed along the longitudinal direction of the dispersion-managed optical fiber. Due to such a structure, without changing the cross-sectional dimension of the dispersion-managed optical fiber along the longitudinal direction, the continuous dispersion-managed optical fiber in which the portions having a positive chromatic dispersion at the predetermined wavelength and the portions having a negative chromatic dispersion at a predetermined wavelength are arranged alternately can be obtained. Accordingly, the manufacturing of the dispersion-managed optical fiber according to the present invention is facilitated and there is no possibility that the connection of such optical fiber with other optical fiber increases the connection loss.

It is preferable to set the signal wavelength band to 1.53 μm–1.60 μm and it is more preferable to set the signal wavelength band to 1.54 μm–1.56 μm. This is because that, in general, such a wavelength band is a range which allows the silica-based optical fiber to suppress the transmission loss as small as possible and a sufficient transmission quality can be maintained in the WDM transmission which adopts the dispersion-managed optical fiber as an optical transmission line.

In the dispersion-managed optical fiber according to the present invention, it is preferable that each first portion has the chromatic dispersion of not less than +1 ps/nm/km but not more than +10 ps/nm/km at the predetermined wavelength within the signal wavelength band and each second portion has the chromatic dispersion of not less than −10 ps/nm/km but not more than −1 ps/nm/km at the predetermined wavelength within the signal wavelength band. Further, it is preferable that each first portion has the length of not less than 500 m but not more than 10 km and each second portion has the length of not less than 500 m but not more than 10 km. By designing the first and second portions such that they fall within the above-mentioned ranges, the easiness of manufacturing the dispersion-managed optical fiber can be ensured and simultaneously the deterioration of transmission characteristics caused by the interaction between the cumulative chromatic dispersion and the nonlinear optical phenomenon can be effectively suppressed.

The first portion has the positive dispersion slope at the predetermined wavelength within the signal wavelength band and the second portion has the negative dispersion slope at the predetermined wavelength within the signal wavelength band. Due to such a constitution, the increase of cumulative chromatic dispersion can be effectively suppressed and simultaneously the cumulative dispersion slope from a viewpoint of the whole dispersion-managed optical fiber can be made small. Further, the wider band can be used as the signal wavelength band for the WDM transmission.

In the dispersion-managed optical fiber according to the present invention, it is preferable that the cumulative length of transient portions, which are positioned between each first portion and each second portion arranged alternately and adjacent to each other and which have the chromatic dispersion whose absolute value is less than 1 ps/nm/km at the predetermined wavelength in the signal wavelength band amounts to not more than 10% of the total length of the dispersion-managed optical fiber. In this case, by designing such that the transient portions which are liable to generate the nonlinear optical phenomenon become short, the deterioration of the transmission characteristics caused by the nonlinear optical phenomenon can be effectively suppressed.

Further, in the dispersion-managed optical fiber according to the present invention, the mean chromatic dispersion at the predetermined wavelength within the signal wavelength band from the viewpoint of the whole dispersion-managed optical fiber has the absolute value of not more than 3 ps/nm/km and preferably of substantially 0 (−1 to +1 ps/nm/km). Due to such a constitution, at the predetermined wavelength in the signal wavelength band, the cumulative chromatic dispersion of the whole dispersion-managed optical fiber can be suppressed to a small amount so that the deterioration of transmission characteristics caused by the interaction between the cumulative chromatic dispersion and the nonlinear optical phenomenon can be effectively suppressed. It is preferable that the effective area at the predetermined wavelength in the signal wavelength band is not less than 40 μm². It is also preferable that the polarization mode dispersion is not more than 0.2 ps·km$^{-\frac{1}{2}}$. In both cases, the deterioration of the transmission characteristics caused by the nonlinear optical phenomenon and the polarization mode dispersion can be effectively suppressed.

The dispersion-managed optical fiber according to the present invention includes a core region which extends along a predetermined axis and a cladding region provided around an outer periphery of the core region. Particularly, the core region preferably includes a layer substantially provided of pure silica glass. In the layer provided of pure silica glass, the residual stress which is generated by the drawing largely depends on the drawing tension so that the refractive index is changed corresponding to this residual stress and also the chromatic dispersion is also changed corresponding to this residual stress. Accordingly, such a layer is preferable to realize the dispersion-managed optical fiber. Further, following refractive index profiles are applicable to the dispersion-managed optical fiber according to the present invention.

That is, the first refractive index profile is realized by the core region comprising a first core, a second core and a third core, and a cladding region provided around the outer periphery of the core region. Particularly, the first core is a glass layer doped with $GeO_2$ and has the relative refractive index difference of not less than 0.4% with respect to the reference region within the cladding region. The second core is a glass layer provided around the outer periphery of the first core and doped with F element. The second core has the refractive index lower than that of pure silica glass. The third core is a glass layer provided around the outer periphery of the second core and substantially is comprised of pure silica glass. The cladding region includes a layer doped with F element and having the refractive index lower than that of pure silica glass. The first core preferably has the outer diameter of not less than 4 $\mu$m but not more than 9 $\mu$m and the relative refractive index difference of not less than 0.4% but not more than 1.1% to the reference region in the cladding region. The second core preferably has the outer diameter of not less than 6 $\mu$m but not more than 20 $\mu$m and the relative refractive index difference of not less than 0% but not more than 0.1% to the reference region in the cladding region. The third core preferably has the outer diameter of not less than 10 $\mu$m but not more than 30 $\mu$m and the relative refractive index difference of not less than 0.05% but not more than 0.5% to the reference region in the cladding region.

The second refractive index profile differs from the first refractive index profile on a point that the refractive index of the second core is lower than the refractive index of the F element doped layer in the cladding region. Here, the first core has the outer diameter of not less than 4 $\mu$m but not more than 9 $\mu$m and the relative refractive index difference of not less than 0.4% but not more than 1.1% to the reference region in the cladding region. The second core has the outer diameter of not less than 6 $\mu$m but not more than 20 $\mu$m and the relative refractive index difference of not less than −0.6% but less than 0% to the reference region in the cladding region. The third core has the outer diameter of not less than 10 $\mu$m but not more than 30 $\mu$m and the relative refractive index difference of not less than 0.05% but not more than 0.5% to the reference region in the cladding region.

Further, the third refractive index profile is realized by a core region comprising a first core and a second core extending along a predetermined axis and a cladding region provided around the outer periphery of the core region. Here, the first core is a glass layer doped with $GeO_2$ and has the relative refractive index difference of not less than 0.7% with respect to the reference region in the cladding region. The second core is a glass layer provided around the outer periphery of the first core and is substantially comprised of pure silica glass. The cladding region includes a layer doped with F element and having the refractive index lower than that of pure silica glass. The first core preferably has the outer diameter of not less than 3 $\mu$m but not more than 6 $\mu$m and the relative refractive index difference of not less than 0.7% but not more than 1.2% to the reference region in the cladding region. The second core preferably has the outer diameter of not less than 15 $\mu$m but not more than 25 $\mu$m and the relative refractive index difference of exceeding 0% but not more than 0.3% to the reference region in the cladding region.

In any one of the first to third refractive index profiles, the cladding region may comprises an inner cladding provided around the outer periphery of the core region and an outer cladding provided around the outer periphery of the inner cladding and having the refractive index higher than that of the inner cladding (depressed cladding structure). In such a depressed cladding structure, the inner cladding preferably has the outer diameter of not less than 25 $\mu$m but not more than 60 $\mu$m and the reference refractive index difference of not less than −0.4% but less than 0% with respect to the outer cladding (the reference region of the cladding region).

In this manner, there may be a case that the cladding region comprises a plurality of glass layers which differ in the refractive index. Accordingly, when the cladding region comprises a single glass layer, the cladding region itself becomes the reference region and when the cladding region has the depressed cladding structure, the outer cladding as the outermost layer becomes the reference region.

Further, the fourth refractive index profile is realized by a single core region and a cladding region provided around the outer periphery of the core region. The core region is a glass layer substantially comprised of pure silica glass. The cladding region includes an inner cladding provided around the outer periphery of the core region and doped with F element and an outer cladding provided around the outer periphery of the inner cladding and being a glass layer doped with F element and having the refractive index higher than that of inner cladding. The core region preferably has the outer diameter of not less than 3 $\mu$m but not more than 7 $\mu$m and the relative refractive index difference of not less than 0.4% but not more than 0.9% to the outer cladding (reference region in the cladding region). The inner cladding preferably has the outer diameter of not less than 7 $\mu$m but not more than 14 $\mu$m and the relative refractive index difference of not less than −0.6% but less than 0% with respect to the outer cladding.

The outer diameter of the dispersion-managed optical fiber according to the present invention may be changed in synchronous with the change of the refractive index of a glass layer not doped with $GeO_2$ along the longitudinal direction of the dispersion-managed optical fiber. Further, the outer diameter of the dispersion-managed optical fiber according to the present invention may be changed in synchronous with the change of the residual stress in each glass layer along the longitudinal direction of the dispersion-managed optical fiber. In both cases, due to the change of the outer diameter of the fiber, the adjustment of chromatic dispersion can be facilitated. Further, even when the outer diameter of the fiber is changed, the adjustment of chromatic dispersion can be performed effectively with a slight change of the outer diameter of the fiber. Since the sufficient dispersion adjustment effect can be obtained with the slight change of the outer diameter of the fiber, the dispersion-managed optical fiber can be manufactured easily and the increase of the connection loss in connecting the dispersion-managed optical fiber to other optical fiber can be effectively suppressed.

Subsequently, the dispersion-managed optical fiber according to the present invention is obtained in the following manner. That is, a method of manufacturing the dispersion-managed optical fiber according to the present invention prepares a predetermined optical fiber preform and draws this optical fiber preform while adjusting the drawing tension. The prepared optical fiber preform is made uniform such that the maximum change of dopant concentration along the longitudinal direction of the optical fiber preform in the region which contains the dopant for adjustment of refractive index among regions corresponding to the plurality of glass layers in the dispersion-managed optical fiber becomes not more than 20%–30%, and preferably, not more than 10%. Further, the prepared optical fiber preform may be made uniform such that the maximum change of refractive indices of respective regions corresponding to the plurality of glass layers in the dispersion-managed optical fiber to the pure silica glass along the longitudinal direction of the optical fiber preform becomes not more than 20%–30%.

To ease the manufacturing of the dispersion-managed optical fiber, it is preferable that the drawing tension applied to the prepared optical fiber preform is changed by changing the temperature of molten portion of the optical fiber preform or changing the drawing speed. In addition, the outer diameter of the fiber may be changed in synchronous with the change of the drawing speed (the temperature change of the molten portion in the optical fiber preform and the change of drawing speed). By changing the outer diameter of the fiber, the adjustment of chromatic dispersion is facilitated. Further, even when the outer diameter of the fiber is changed, the adjustment of chromatic dispersion can be sufficiently performed with the slight change of the outer diameter of the fiber.

The dispersion-managed optical fiber according to the present invention is applicable to the optical communication system for the WDM transmission. The dispersion-managed optical fiber constitutes a part of an optical transmission line installed between repeaters, such as between a transmitter which irradiates signals of a plurality of channels and a repeater which includes an optical amplifier, between respective repeaters or between a repeater and a receiver. Particularly, it is preferable that the dispersion-managed optical fiber is arranged at the upstream side as seen from the traveling direction of the signals having a wavelength within the signal wavelength band in the repeater spacing. By arranging the dispersion-managed optical fiber in this manner, the deterioration of the transmission characteristics can be effectively suppressed at the upstream of the repeater spacing where the signal power is large and hence, the nonlinear optical phenomenon is liable to be generated.

Further, in each repeater spacing of the optical communication system according to the present invention, at the predetermined wavelength within the signal wavelength band, it is preferable that the absolute value of the mean chromatic dispersion from the viewpoint of the whole repeater spacing is not more than 3 ps/nm/km and further substantially 0 (−1 to +1 ps/nm/km). This is because that the deterioration of transmission characteristics caused by the interaction between the cumulative chromatic dispersion in the optical transmission line and the nonlinear optical phenomenon can be effectively suppressed and the sufficient transmission quality of the WDM transmission can be maintained. Further, to realize the soliton communication, in each repeater spacing of the optical communication system, it is preferable that the mean chromatic dispersion at the predetermined wavelength within the signal wavelength band is not less than 0.1 ps/nm/km but not more than 1.0 ps/nm/km.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a refraction index profile of a second embodiment of a dispersion-managed optical fiber according to the present invention.

FIG. 7 is a refraction index profile of a third embodiment of a dispersion-managed optical fiber according to the present invention.

FIG. 19 is a table which arranges various characteristics of samples having chromatic dispersion characteristics shown in FIG. 12 to FIG. 18 as respective embodiments of the dispersion-managed optical fiber according to the present invention.

DESCRIPTION OF THE PREFERRED EMBODIMENTS

Respective embodiments of dispersion-managed optical fibers and the like according to the present invention are explained hereinafter in conjunction with FIGS. 1–4, 5A, 5B, 6–22, 22A–22C and 23–28 hereinafter. In the explanation of the drawings, same signs are attached to same components and the overlapped explanation thereof is omitted.

Figure 1:
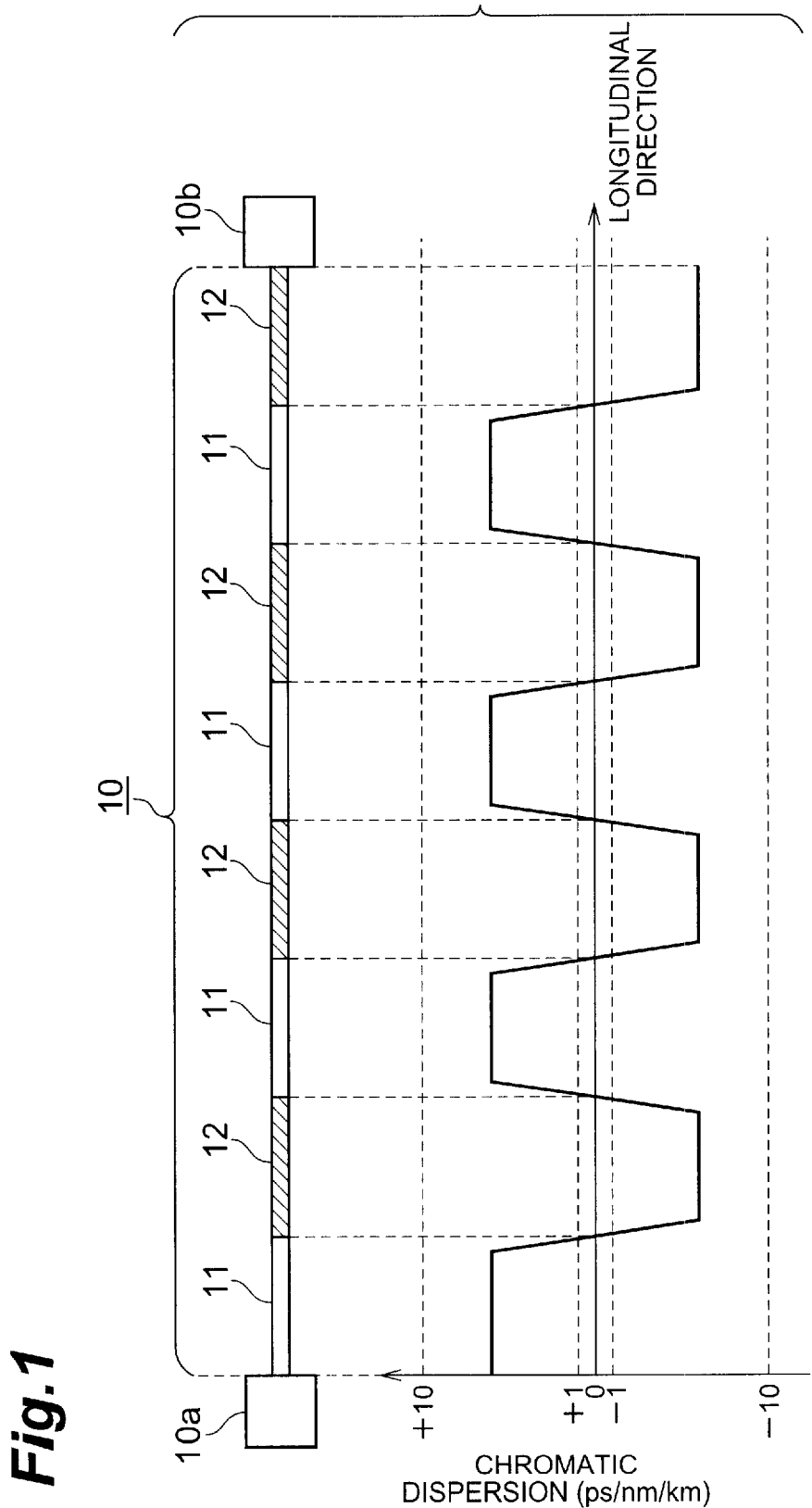
FIG. 1 is a view explaining a schematic constitution of a dispersion-managed optical fiber according to the present invention and a schematic constitution of an optical communication system to which the dispersion-managed optical. fiber is applied.
Figure 2:
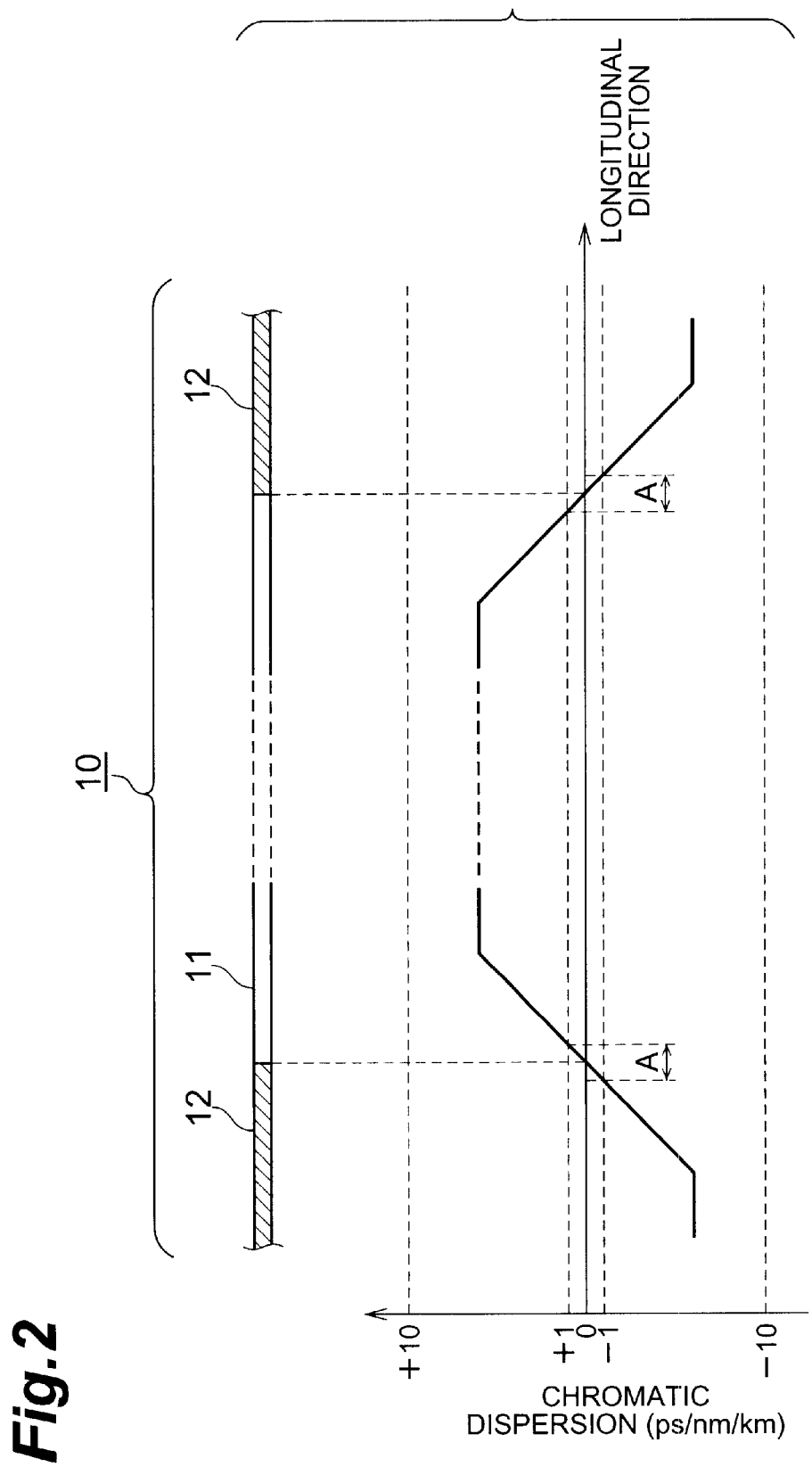
FIG. 2 is a partially enlarged view of the dispersion-managed optical fiber shown in FIG. 1.

FIG. 1 is a view showing a schematic constitution of a dispersion-managed optical fiber according to the present invention and a schematic constitution of an optical communication system to which the dispersion-managed optical fiber is applied. FIG. 2 is a partially enlarged view of the dispersion-managed optical fiber shown in FIG. 1. This dispersion-managed optical fiber 10 comprises a portion of an optical transmission line in each repeater spacing such as between a transmitter which transmits signals of a plurality of channels and the repeater which includes an optical amplifier, between respective repeaters or between the repeater and a receiver. In the drawing, numeral 10a shows either the transmitter or the repeater and numeral 10b indicates either the repeater or the receiver. The dispersion-managed optical fiber 10 is a silica-based optical fiber ensuring its single mode at a predetermined wavelength within a signal wavelength band. The dispersion-managed optical fiber 10 is also a continuous optical fiber in which one or more first portions 11 having a positive chromatic dispersion at the predetermined wavelength and one or more second portions 12 having a negative chromatic dispersion at the predetermined wavelength are arranged alternately and adjacent to each other. The signal wavelength band is the 1.55 $\mu$m-wavelength band which includes the signal wavelengths of the plurality of channels used in the WDM transmission. To be more specific, the signal wavelength band is 1.53 $\mu$m–1.60 $\mu$m and at least 1.54 $\mu$m–1.56 $\mu$m. Since, in general, the transmission loss of the silica-based optical fiber becomes small in this wavelength band, the wavelength band is a wavelength band suitable for the WDM transmission.

The dispersion-managed optical fiber 10 includes a plurality of glass layers which are sequentially laminated in the radial direction, wherein the dopant concentration of the glass layer which contains a dopant, among a plurality of these glass layers, is made uniform such that the maximum change thereof along the longitudinal direction is suppressed to not more than 20–30% (=(maximum concentration value–minimum concentration value/minimum concentration value×100) and preferably not more than 10%. On the other hand, the first portions 11 and the second portions 12 which are arranged alternately adjacent to each other and have the distribution of chromatic dispersion along the longitudinal direction of the dispersion-managed optical fiber 10, that is, the first portions 11 having the positive chromatic dispersion and the second portions 12 having the negative chromatic dispersion, are formed by changing the refractive index of the glass layer which is not substantially doped with $GeO_2$ as a dopant or by changing the residual stress (the change of refractive index by a photoelastic effect).

In this manner, in the dispersion-managed optical fiber 10 according to the present invention, by changing the refractive index or the residual stress of the glass layer which is not doped with $GeO_2$ along the longitudinal direction while making the dopant concentration uniform along the longitudinal direction, the chromatic dispersion is adjusted (the first portions 11 and the second portions 12 are alternately arranged). Accordingly, the dispersion-managed optical fiber 10 has a structure which has a uniform cross-sectional structure while changing the refractive index or the residual stress along the longitudinal direction so that the dispersion-managed optical fiber 10 can be manufactured easily and can be easily connected to other optical fiber without increasing the connection loss.

By forming the first and second portions with the adjustment of predetermined residual stress, even if a predetermined amount of $GeO_2$ is unintentionally added into this pure silica glass layer during the manufacturing, the relative refractive index difference of this glass layer, to which the residual stress is given, with respect to the pure silica glass can be suppressed at a low value compared with the relative refractive index difference of the glass layer, into which an amount of $GeO_2$ equal to the amount of the added $GeO_2$, with respect to pure silica glass, and therefore the influence of $GeO_2$ can be effectively suppressed.

In addition, the dispersion-managed optical fiber 10 may slightly change the outer diameter thereof in synchronous with the change of the refractive index of the glass layer not doped with $GeO_2$ or may slightly change the outer diameter thereof in synchronous with the change of the residual stress. By changing the outer diameter of the fiber in this manner, the adjustment of chromatic dispersion becomes easier. Further, even when the outer diameter of the optical fiber is changed, a sufficient adjustment effect for chromatic dispersion can be obtained with the slight change of the outer diameter of the optical fiber. Since the change of the outer diameter of the optical fiber can be made slight, in this case also, the manufacturing of the optical fiber becomes easy and the optical fiber can be connected to another optical fiber in the state that the increase of the connection loss can be effectively suppressed.

It is preferable that the first and second portions 11, 12 of the dispersion-managed optical fiber 10 respectively have the chromatic dispersion whose absolute values is not less than 1 ps/nm/km at the predetermined wavelength within the signal wavelength band. Due to such a constitution, the deterioration of transmission characteristics caused by the nonlinear optical phenomenon can be effectively suppressed. The first and second portions 11, 12 of the dispersion-managed optical fiber 10 may respectively have the chromatic dispersion whose absolute values is not more than 10 ps/nm/km at a predetermined wavelength within the signal wavelength band. Even in such a case, since the cumulative chromatic dispersion at respective portions 11, 12 does not amount to large values, the deterioration of the transmission characteristics caused by the interaction between the cumulative chromatic dispersion and the nonlinear optical phenomenon can be effectively suppressed.

It is preferable that the first and second portions 11, 12 of the dispersion-managed optical fiber 10 respectively have the lengths of not less than 500 m. This is because that when the frequency of changing the sign of chromatic dispersion becomes large, the manufacturing of the dispersion-managed optical fiber 10 becomes difficult. However, it is preferable that the first and second portions 11, 12 of the dispersion-managed optical fiber 10 respectively have the lengths of not more than 10 km. This is because that the cumulative chromatic dispersion at the respective portions 11, 12 does not amount to large values and hence, the deterioration of transmission characteristics caused by the interaction between the cumulative chromatic dispersion and the nonlinear optical phenomenon can be effectively suppressed.

The dispersion-managed optical fiber 10 is provided with transient portions A (see FIG. 2) each of which is positioned between the first and second portion 11, 12 which are disposed adjacent to each other. In other words, either the first portion 11 or the second portion 12 is positioned between these transient portions A. These transient portions A have the chromatic dispersion whose absolute value is not more than 1 ps/nm/km at the predetermined wavelength within the signal wavelength band. It is preferable that the cumulative length of these transient portions A amounts to not more than 10% of the total length of the dispersion-managed optical fiber 10. Due to such a constitution, the rate that the transient sections A where the nonlinear optical phenomenon is liable to occur occupy in the dispersion-managed optical fiber 10 becomes small and hence, the deterioration of transmission characteristics caused by the nonlinear optical phenomenon can be suppressed.

Figure 3:
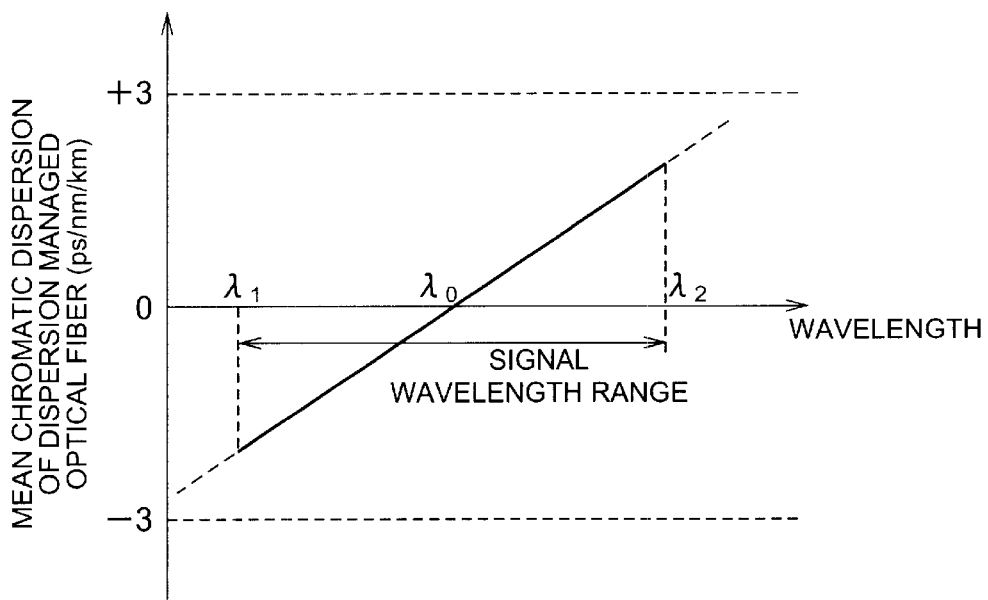
FIG. 3 is a graph showing the mean wavelength dispersion characteristics from the viewpoint of the whole dispersion-managed optical fiber according to the present invention.

FIG. 3 is a graph showing the mean chromatic dispersion characteristics from the viewpoint of the whole dispersion-managed optical fiber according to the present invention. As shown in the graph, it is preferable that the mean chromatic dispersion of the dispersion-managed optical fiber 10 is set such that the mean chromatic dispersion at the predetermined wavelength $\lambda 0$ within the signal wavelength band $\lambda 1-\lambda 2$ ($\lambda 1$: minimum wavelength, $\lambda 2$: maximum wavelength) is zero. It is because that the cumulative chromatic dispersion from the viewpoint of the whole dispersion-managed optical fiber 10 within the signal wavelength band $\lambda 1-\lambda 2$ can be suppressed to a small value. Further, it is preferable that the mean chromatic dispersion within the signal wavelength band $\lambda 1-\lambda 2$ from the viewpoint of the whole dispersion-managed optical fiber 10 has the absolute value of not more than 3 ps/nm/km. This is because that the deterioration of transmission characteristics caused by the interaction between the cumulative chromatic dispersion and the nonlinear optical phenomenon can be effectively suppressed.

Figure 4:
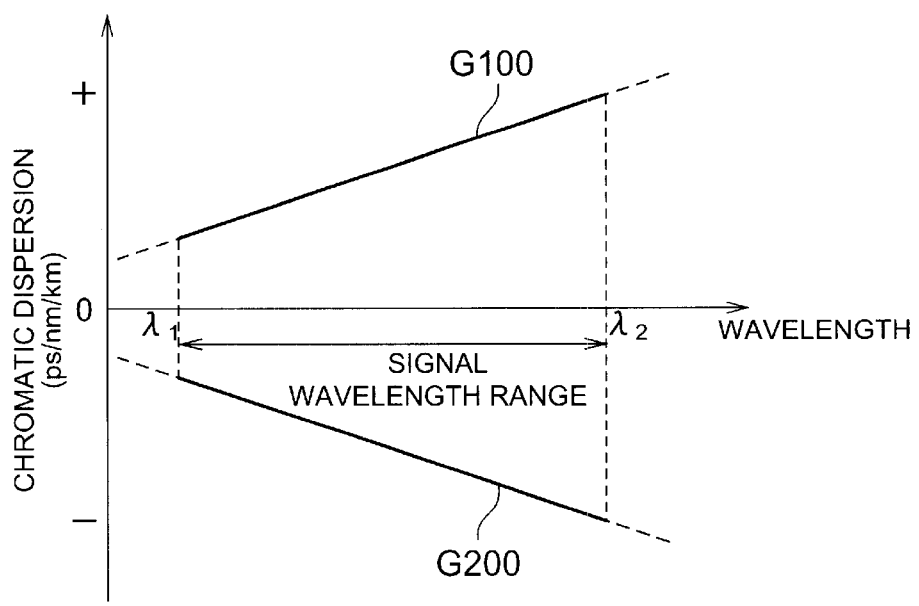
FIG. 4 is a graph respectively showing the chromatic dispersion characteristics of a first portion (portion having a positive chromatic dispersion) and the chromatic dispersion characteristics of a second portion (portion having a negative chromatic dispersion) of the dispersion-managed optical fiber according to the present invention.

FIG. 4 is a graph showing the chromatic dispersion characteristics at respective portions of the dispersion-managed optical fiber 10 according to the present invention. In the drawing, a graph G100 indicates the chromatic dispersion characteristics of the first portions 11, and a graph G200 indicates the chromatic dispersion characteristics of the second portions 12. As shown in the graph, in the dispersion-managed optical fiber 10, it is preferable that the first portions 11 have a positive dispersion slope at the signal wavelength band and the second portions 12 have a negative dispersion slope at the signal wavelength band. Due to such a constitution, from the viewpoint of the whole dispersion-managed optical fiber 10, not only the cumulative dispersion slope but also the cumulative chromatic dispersion can be made small and hence, the wider band can be used as the signal wavelength band of the WDM transmission.

Further, it is preferable that the dispersion-managed optical fiber 10 has the effective area $A_{eff}$ of not less than 40 $\mu m^2$ at the predetermined wavelength within the signal wavelength band. In this case, the deterioration of transmission characteristics caused by the nonlinear optical phenomenon can be effectively suppressed. Further, it is preferable that the dispersion-managed optical fiber 10 has a polarization mode dispersion of not more than 0.2 ps·km$^{-1/2}$ at the predetermined wavelength within the signal wavelength band. In this case, the deterioration of transmission characteristics caused by the polarization mode dispersion can be suppressed.

The above-mentioned effective area $A_{eff}$ is given by a following equation as indicated by Japanese Patent Laid-open No. 248251/1996 (EP 0 724 171 A2).

$$A_{\text{eff}} = 2\pi \left( \int_0^\infty E^2 r dr \right)^2 \bigg/ \left( \int_0^\infty E^4 r dr \right)$$

where, E is an electric field generated by a propagation light and r is a distance in the radial direction from the center of the core.

Figure 5A:
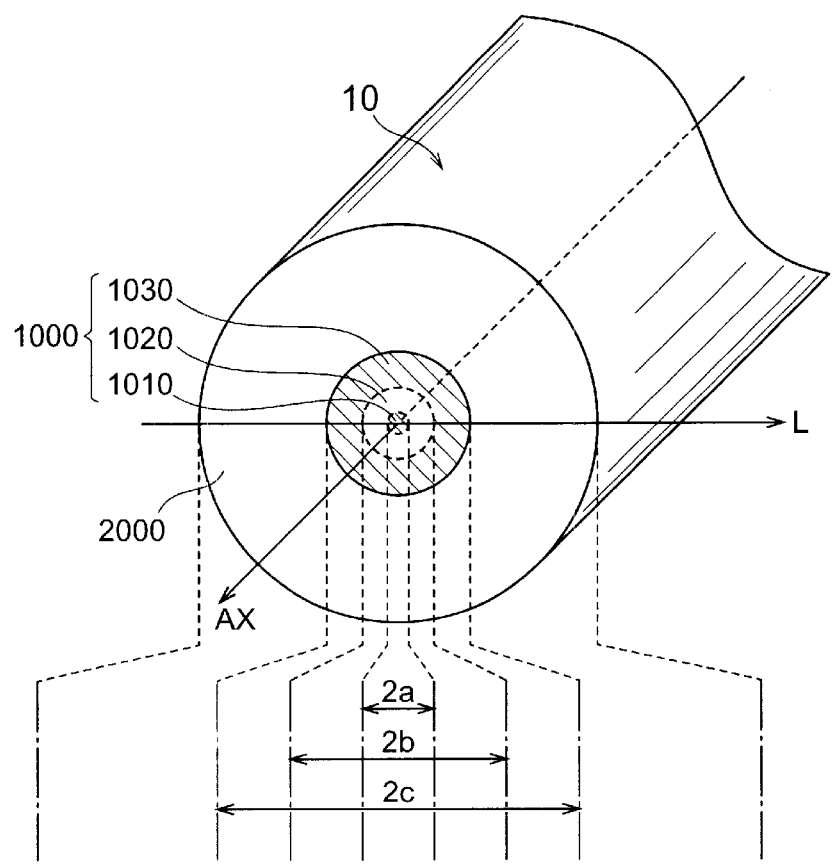
FIG. 5A and FIG. 5B are views showing across-sectional structure and a refractive index profile of a first embodiment of a dispersion-managed optical fiber according to the present invention.

Subsequently, respective embodiments of the dispersion-managed optical fiber 10 according to the present invention are explained hereinafter. As shown in FIG. 5A, each embodiment of the dispersion-managed optical fiber 10 comprises a core region 1000 extending along a predetermined axis AX and a cladding region 2000 provided around the outer periphery of the core region 1000. Particularly, it is preferable that at least a part of the core region 1000 includes a layer comprised of non-intentionally-doped pure silica glass. Compared to a glass layer which includes a dopant, the layer comprised of pure silica glass has a high viscosity and hence, the adjustment of residual stress is facilitated (the residual stress generated by drawing largely depending on the drawing tension). By changing this residual stress along the longitudinal direction of the dispersion-managed optical fiber, the refractive index can be changed and eventually the chromatic dispersion is also changed at respective portions of the dispersion-managed optical fiber. Here, the non-intentionally doped glass layer means a glass layer which is not positively doped with impurities for adjustment of refractive index. The glass layer may include a small amount of impurities (for example, Cl element, F element or the like) which is added during the manufacturing process.

(First Embodiment)

As shown in FIG. 5A, in the dispersion-managed optical fiber according to a first embodiment, a core region 1000 has a multi-core structure comprises a first core 1010 extending in a predetermined axis AX, a second core 1020 provided around the outer periphery of the first core 1010 and a third core 1030 provided around the outer periphery of the second core 1020.

Particularly, the first core 1010 is doped with $GeO_2$ and has the outer diameter $2a$ and the refractive index $n_1$. Further, the first core 1010 has the relative refractive index difference of not less than 0.4% with respect to the cladding region 2000. The second core 1020 is doped with F element and has the outer diameter $2b$ and the refractive index $n_2$ which is lower than pure silica glass ($n_2 < n_1$). The third core 1030 is substantially comprised of pure silica glass and has the outer diameter $2c$ and the refractive index $n_3$ ($<n_1, >n_2$). The cladding region 2000 is a single glass layer doped with F element and has the refractive index $n_5$ ($\leq n_2$) lower than that of the pure silica glass. Preferably, the first core 1010 has the outer diameter $2a$ of not less than 4 $\mu$m but not more than 9 $\mu$m and the relative refractive index difference of not less than 0.4% but not more than 1.1% with respect to the cladding region 2000 (single layer) constituting the reference region. The second core 1020 has the outer diameter $2b$ of not less than 6 $\mu$m but not more than 20 $\mu$m and the relative refractive index difference of not less than 0% but not more than 0.1% to the cladding region 2000. The third core 1030 has the outer diameter $2c$ of not less than 10 $\mu$m but not more than 30 $\mu$m and the relative refractive index difference of not less than 0.05% but not more than 0.5% with respect to the cladding region 2000.

Figure 5B:
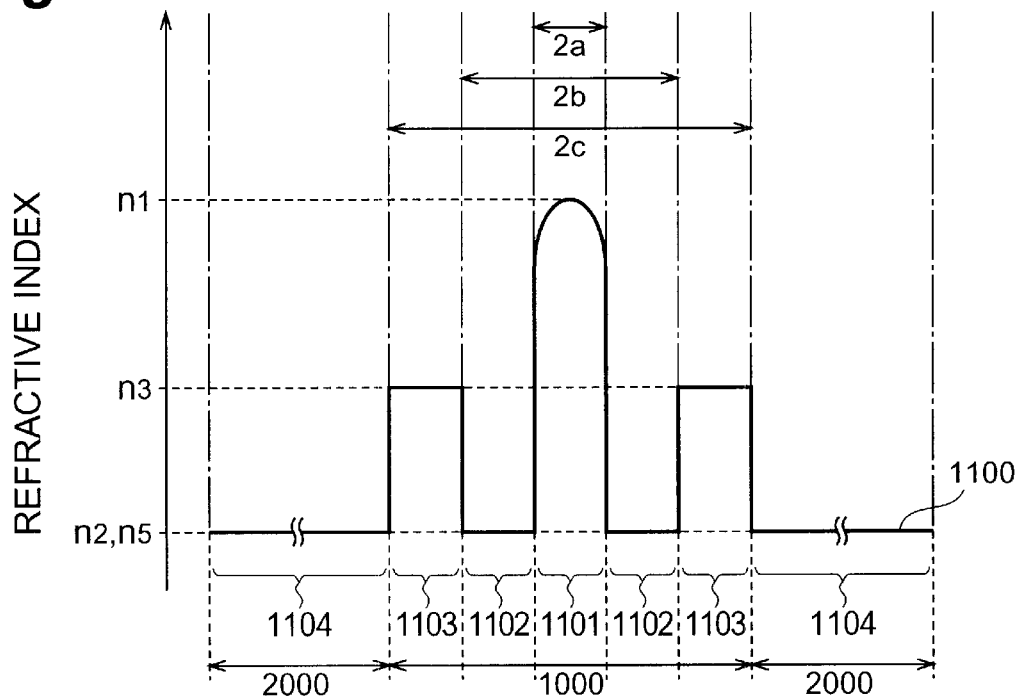

The refractive index profile 1100 shown in FIG. 5B shows the refractive indices at respective positions on a line L which is perpendicular to the axis AX in FIG. 5A, wherein a region 1101 expresses the refractive index of the first core 1010 on the line L, a region 1102 expresses the refractive index of the second core 1020 on the line L, a region 1103 expresses the refractive index of the third core 1030 on the line L, and a region 1104 expresses the refractive index of the cladding region 2000 on the line L.

Further, the relative refractive index differences $\Delta n_1 - \Delta n_3$ of respective glass layers 1010–1030 using the cladding region 2000 as the reference region are expressed by following equations respectively.

$$\Delta n_1 = (n_1 - n_5)/n_5$$

$$\Delta n_2 = (n_2 - n_5)/n_5$$

$$\Delta n_3 = (n_3 - n_5)/n_5$$

In this specification, the relative refractive index difference of each glass layer 1010–1030 with respect to the reference region is expressed by percentage and the refractive indices in each equation are not in a fixed order. Accordingly, the refractive index of the glass layer whose relative refractive index difference takes a negative value means that the refractive index is lower than the refractive index of the reference region.

(Second Embodiment)

Subsequently, the dispersion-managed optical fiber according to a second embodiment having the refractive index profile 1200 of a multi-core type shown in FIG. 6 also comprises a core region 1000 (having first to third cores as in the case of the first embodiment) extending along a predetermined axis AX and a cladding region 2000 provided around the outer periphery of the core region 1000 as shown in FIG. 5A. However, the second embodiment differs from the first embodiment on a point that the cladding region 2000 has a depressed cladding structure. That is, the cladding region 2000 comprises an inner cladding provided around the outer periphery of a third core in the core region 1000 and an outer cladding provided around the outer periphery of the inner cladding. The inner cladding is doped with F element and has an outer diameter $2d$ and has the refractive index $n_4$ lower than the respective refractive indices $n_3, n_5$ of the third core and the outer cladding. In this second embodiment, the reference region which is used for defining the relative refractive index differences of respective glass layers is the outer cladding as a outermost shell layer. Further, the outer diameter $2d$ of the inner cladding is not less than 25 $\mu$m but not more than 60 $\mu$m and has the relative refractive index difference ($=(n_4-n_5)/n_5$) of not less than −0.4% but less than 0% with respect to the outer cladding.

The refractive index profile 1200 shown in FIG. 6 corresponds to the refractive indices at respective positions on a line L which is perpendicular to the axis AX in FIG. 5A, wherein a region 1201 expresses the refractive index of the first core on the line L, a region 1202 expresses the refractive index of the second core on the line L, a region 1203 expresses the refractive index of the third core on the line L, a region 1204 expresses the refractive index of the inner cladding on the line L, and a region 1205 expresses the refractive index of the outer cladding on the line L.

(Third Embodiment)

The refractive index profile 1300 of multi-core type shown in FIG. 7 is the refractive index profile of the dispersion-managed optical fiber according to a third embodiment. The dispersion-managed optical fiber according to this third embodiment comprises a core region 1000 extending along a predetermined axis AX and a cladding region 2000 (see FIG. 5A) provided around the outer periphery of the core region 1000 as in the case of the first embodiment. The core region 1000 comprises a first core extending along the predetermined axis AX, a second core provided around the outer periphery of the first core, and a third core provided around the outer periphery of the second core.

Particularly, the first core is doped with $GeO_2$ and has the outer diameter 2a and the maximum refractive index $n_1$. Further, the first core has the relative refractive index difference of not less than 0.4% with respect to the cladding region 2000 which constitutes the reference region. The second core is doped with F element and has the outer diameter 2b and the refractive index $n_2$ lower than that of the pure silica glass ($n_2 < n_1$). The third core is substantially comprised of pure silica glass and has the outer diameter 2c and the refractive index $n_3$ ($<n_1$, $>n_2$). The cladding region 2000 is a single glass layer which is doped with F element and has the refractive index $n_5$ lower than that of the pure silica glass $n_5$ ($\leq n_3$). In this third embodiment, the refractive index of the second core is set to a value lower than that of the refractive index of the cladding region 2000. Preferably, the first core has the outer diameter 2a of not less than 4 μm but not more than 9 μm and the relative refractive index difference ($=(n_1-n_5)/n_5$) of not less than 0.4% but not more than 1.1% with respect to the cladding region 2000 (single layer) constituting the reference region. The second core has the outer diameter 2b of not less than 6 μm but not more than 20 μm and the relative refractive index difference ($=(n_2-n_5)/n_5$) of not less than −0.6% but less than 0% with respect to the cladding region 2000. The third core has the outer diameter 2c of not less than 10 μm but not more than 30 μm and the relative refractive index difference ($=(n_3-n_5)/n_5$) of not less than 0.05% but not more than 0.5% with respect to the cladding region 2000.

Further, the refractive index profile 1300 shown in FIG. 7 corresponds to shows the refractive indices at respective positions on a line L which is perpendicular to the axis AX in FIG. 5A, wherein a region 1301 expresses the refractive index of the first core on the line L, a region 1302 expresses the refractive index of the second core on the line L, a region 1303 expresses the refractive index of the third core on the line L, and a region 1304 expresses the refractive index of the cladding region 2000 on the line L.

(Fourth Embodiment)

Figure 8:
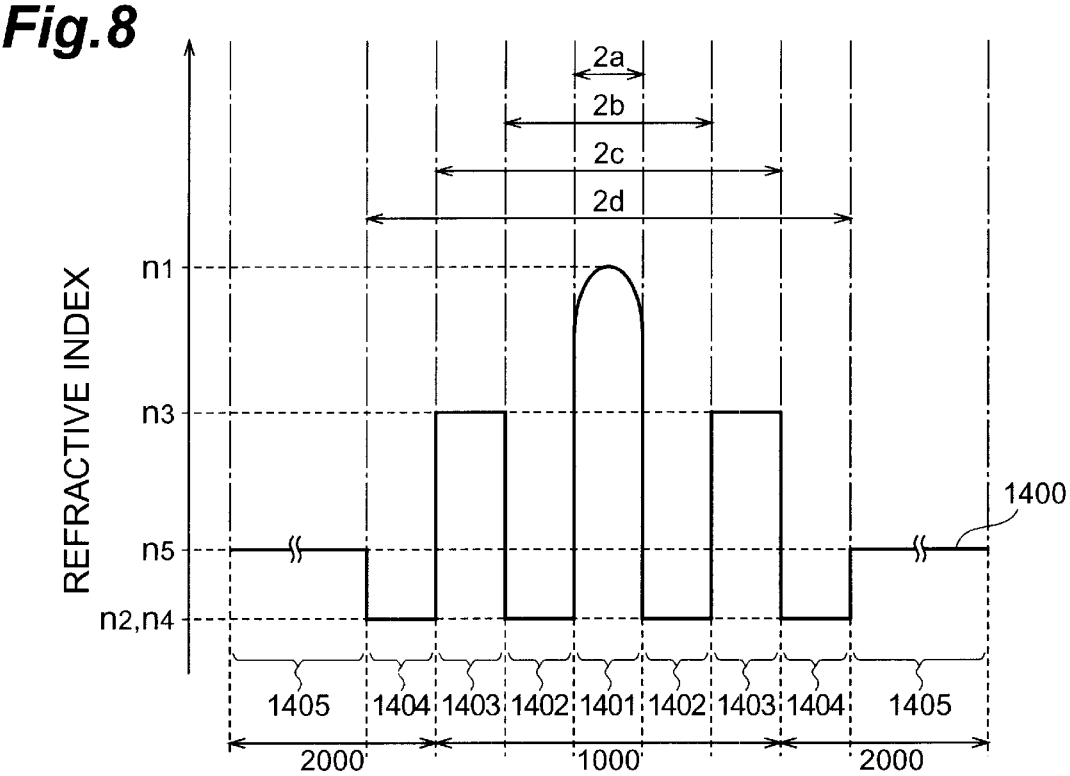
FIG. 8 is a refraction index profile of a fourth embodiment of a dispersion-managed optical fiber according to the present invention.

FIG. 8 shows the refractive index profile 1400 of a multi-core type of the dispersion-managed optical fiber of a fourth embodiment. The dispersion-managed optical fiber of the fourth embodiment also comprises a core region 1000 (having first to third cores as in the case of the first to third embodiments) extending along a predetermined axis AX and a cladding region 2000 provided around the outer periphery of the core region 1000 as shown in FIG. 5A. However, the fourth embodiment differs from the first and third embodiments on a point that the cladding region 2000 has a depressed cladding structure. That is, the cladding region 2000 comprises an inner cladding provided around the outer periphery of a third core in the core region 1000 and an outer cladding provided around the outer periphery of the inner cladding. The inner cladding is doped with F element and has an outer diameter 2d and has the refractive index $n_4$ which is lower than the refractive index $n_5$ of the outer cladding. In this fourth embodiment, the reference region which is used for defining the relative refractive index differences of respective glass layers is the outer cladding which constitutes the outermost shell layer. Further, the outer diameter 2d of the inner cladding is not less than 25 μm but not more than 60 μm and has the relative refractive index difference ($=(n_4-n_5)/n_5$) of not less than −0.4% but less than 0% with respect to the outer cladding.

The refractive index profile 1400 shown in FIG. 8 corresponds to the refractive indices at respective positions on a line L which is perpendicular to the axis AX in FIG. 5A, wherein a region 1401 expresses the refractive index of the first core on the line L, a region 1402 expresses the refractive index of the second core on the line L, a region 1403 expresses the refractive index of the third core on the line L, a region 1404 expresses the refractive index of the inner cladding on the line L, and a region 1405 expresses the refractive index of the outer cladding on the line L.

(Fifth Embodiment)

Figure 9:
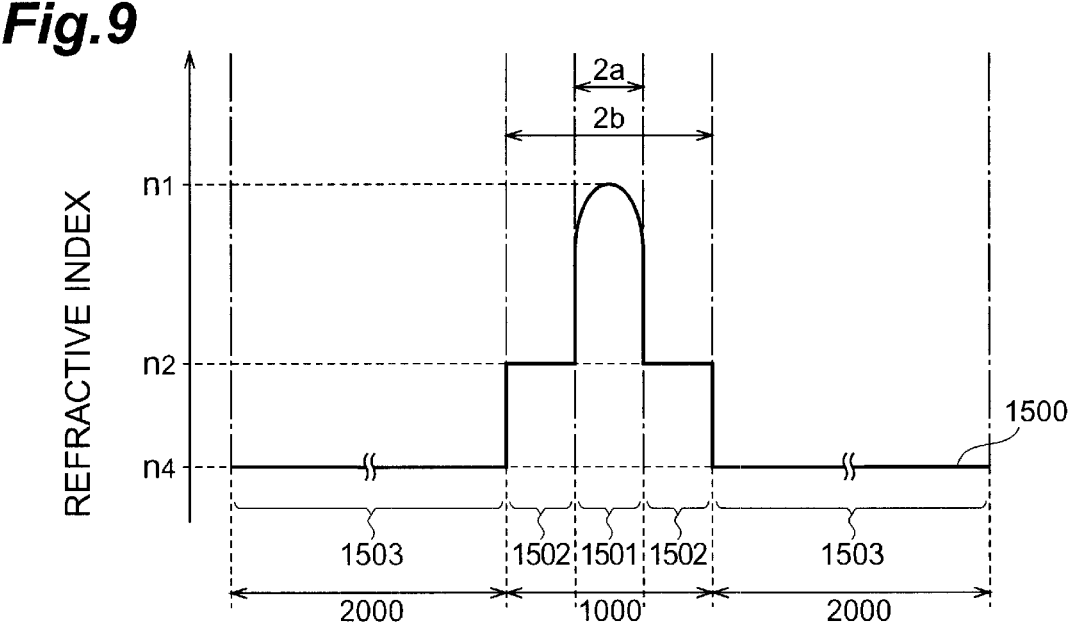
FIG. 9 is a refraction index profile of a fifth embodiment of a dispersion-managed optical fiber according to the present invention.

The refractive index profile 1500 of double-core type shown in FIG. 9 is the refractive index profile of the dispersion-managed optical fiber according to a fifth embodiment. The dispersion-managed optical fiber according to this fifth embodiment comprises a core region 1000 extending along a predetermined axis AX and a cladding region 2000 provided around the outer periphery of the core region 1000 as shown in FIG. 5A. However, in this fifth embodiment, the core region 1000 comprises a first core extending in the predetermined axis AX and a second core provided around the outer periphery of the first core and the cladding region 2000 is comprised of a single glass layer.

Particularly, the first core is doped with $GeO_2$ and has the outer diameter 2a and the maximum refractive index $n_1$. Further, the first core has the relative refractive index difference of not less than 0.7% with respect to the cladding region 2000 which constitutes the reference region. The second core is substantially comprised of pure silica glass and has the outer diameter 2b and the refractive index $n_2$ ($<n_1$). Further, the cladding region 2000 is a single glass layer which is doped with F element and has the refractive index $n_4$ which is lower than that of pure silica glass. Preferably, the first core has the outer diameter 2a of not less than 3 μm but not more than 6 μm and the relative refractive index difference ($=(n_1-n_4)/n_4$) of not less than 0.7% but not more than 1.2% with respect to the cladding region 2000 constituting the reference region. Further, the second core has the outer diameter 2b of not less than 15 μm but not more than 25 μm and the relative refractive index difference ($=(n_2-n_4)/n_4$) of exceeding 0% but not more than 0.3% with respect to the cladding region 2000.

Further, the refractive index profile 1500 shown in FIG. 9 corresponds to the refractive indices at respective positions on a line L which is perpendicular to the axis AX in FIG. 5A, wherein a region 1501 expresses the refractive index of the first core on the line L, a region 1502 expresses the refractive index of the second core on the line L and a region 1503 expresses the refractive index of the cladding region 2000 on the line L.

(Sixth Embodiment)

Figure 10:
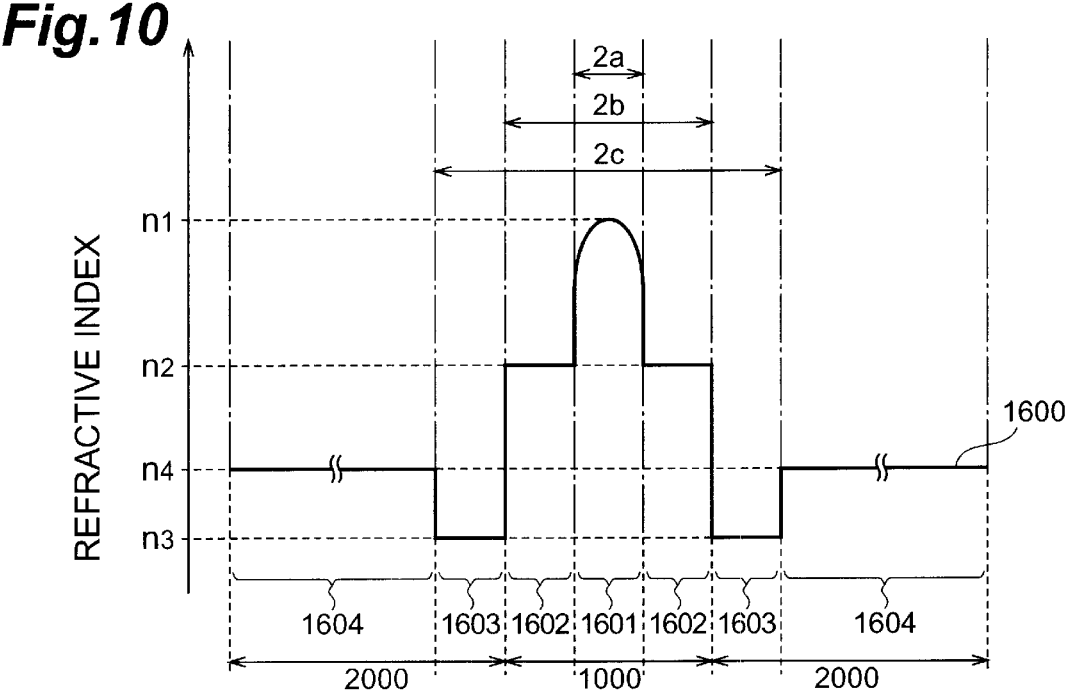
FIG. 10 is a refraction index profile of a sixth embodiment of a dispersion-managed optical fiber according to the present invention.

The refractive index profile 1600 of a double-core type shown in FIG. 10 is the refractive index profile of the dispersion-managed optical fiber of a sixth embodiment. The dispersion-managed optical fiber of this sixth embodiment also comprises a core region 1000 (having first and second cores as in the case of the fifth embodiment) extending along a predetermined axis AX and a cladding region 2000 provided around the outer periphery of the core region 1000 as shown in FIG. 5A. However, the sixth embodiment differs from the fifth embodiment on a point that the cladding region 2000 has a depressed cladding structure. That is, the cladding region 2000 comprises an inner cladding provided around the outer periphery of the second core in the core region 1000 and an outer cladding provided around the outer periphery of the inner cladding. The inner cladding is doped with F element and has an outer diameter 2c and has the refractive index $n_3$ which is lower than the refractive index $n_4$ of the outer cladding. In this sixth embodiment, the reference region which is used for defining the relative refractive index differences of respective glass layers is the outer cladding which constitutes the outermost shell layer. Further, the outer diameter $\lambda c$ of the inner cladding is not less than 25 $\mu$m but not more than 60 $\mu$m and has the relative refractive index difference $(=(n_3-n_4)/n_4)$ of not less than $-0.4\%$ but less than 0% with respect to the outer cladding.

The refractive index profile 1600 shown in FIG. 10 corresponds to the refractive indices at respective positions on a line L which is perpendicular to the axis AX in FIG. 5A, wherein a region 1601 expresses the refractive index of the first core on the line L, a region 1602 expresses the refractive index of the second core on the line L, a region 1603 expresses the refractive index of the inner cladding on the line L, and a region 1604 expresses the refractive index of the outer cladding on the line L.

(Seventh Embodiment)

Figure 11:
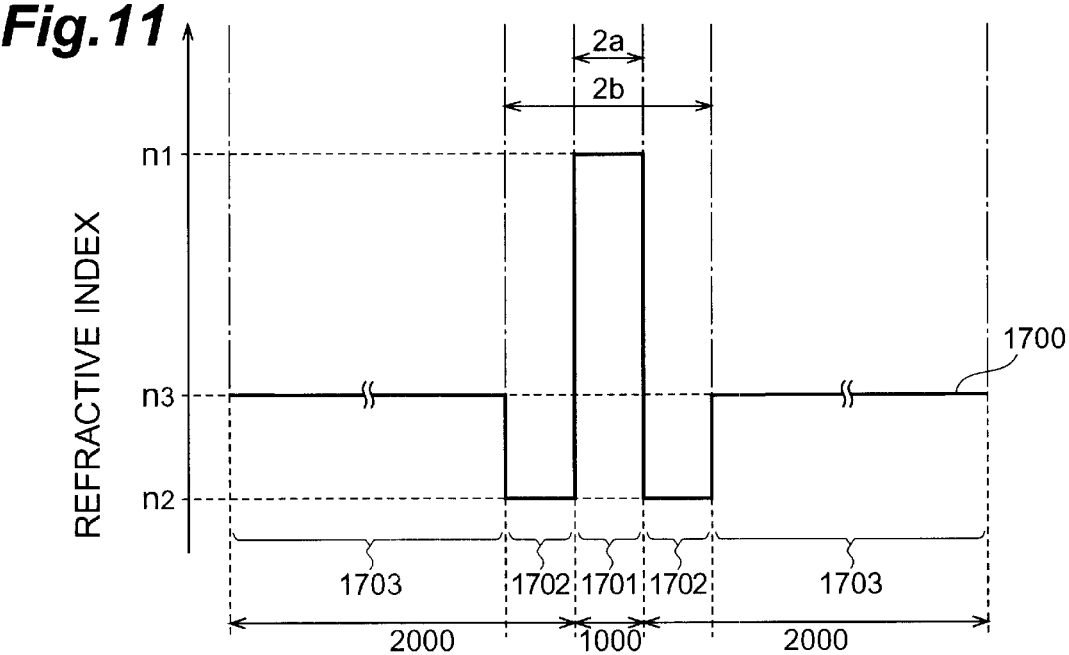
FIG. 11 is a refraction index profile of a seventh embodiment of a dispersion-managed optical fiber according to the present invention.

The refractive index profile 1700 of W type shown in FIG. 11 is the refractive index profile of the dispersion-managed optical fiber according to a seventh embodiment. The dispersion-managed optical fiber according to this seventh embodiment also comprises a core region 1000 extending along a predetermined axis AX and a cladding region 2000 provided around the outer periphery of the core region 1000 as shown in FIG. 5A.

In this seventh embodiment, the core region 1000 is a single layer substantially comprised of pure silica glass and has the outer diameter $2a$ and the refractive index $n_1$. The cladding region 2000 has a depressed cladding structure and comprises an inner cladding provided around the outer periphery of the core region 1000 which constitutes the single layer and an outer cladding provided around the outer periphery of the inner cladding. The inner cladding is doped with F element and has the outer diameter $2b$ and the refractive index $n_2$. Further, the outer cladding is doped with F element and has the refractive index $n_3$ ($<n_1$) which is higher than that of the inner cladding. Preferably, the core region 1000 has the outer diameter $2a$ of not less than 3 $\mu$m but not more than 7 $\mu$m and the relative refractive index difference $(=(n_1-n_3)/n_3)$ of not less than 0.4% but not more than 0.9% with respect to the outer cladding constituting the reference region. Further, the inner cladding has the outer diameter $2b$ of not less than 7 $\mu$m but not more than 14 $\mu$m and the relative refractive index difference $(=(n_2-n_3)/n_3)$ of not less than $-0.6\%$ but less than 0% with respect to the outer cladding.

Subsequently, respective samples which are manufactured as the dispersion-managed optical fibers according to the above-mentioned respective embodiments are explained hereinafter.

(Sample 1)

Figure 12:
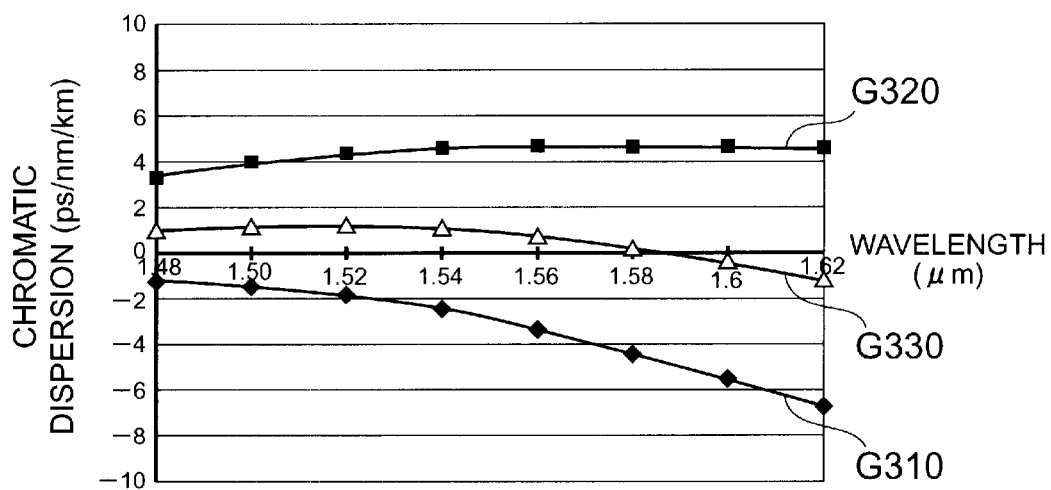
FIG. 12 is a graph respectively showing the chromatic dispersion characteristics of a first portion (portion having a positive chromatic dispersion), the chromatic dispersion characteristics of a second portion (portion having a negative chromatic dispersion) and the mean value of these chromatic dispersion characteristics of the dispersion-managed optical fiber (sample 1) having the refractive index profile shown in FIG. 7.

The dispersion-managed optical fiber according to a sample 1 has the refractive index profile 1300 of the multi-core type shown in FIG. 7 (third embodiment). In this sample 1, the first core has the outer diameter $2a$ of 8.1 $\mu$m and the relative refractive index difference of 0.63% with respect to the cladding region constituting the reference region. The second core has the outer diameter $2b$ of 15.8 $\mu$m and the relative refractive index difference of $-0.25\%$ with respect to the cladding region. The third core has the outer diameter $2c$ of 22.6 $\mu$m and the relative refractive index difference of 0.13%–0.22% with respect to the cladding region. Here, the relative refractive index difference of the third core substantially comprised of pure silica glass with respect to the cladding region largely depends on the drawing tension at the time of manufacturing. Accordingly, by changing this drawing tension periodically, portions where the sign of the generated chromatic dispersion becomes different can be alternately formed in the continuous optical fiber. FIG. 12 shows the chromatic dispersion characteristics at respective portions of this sample 1, wherein a graph G310 indicates the chromatic dispersion characteristics at the second portion having the negative chromatic dispersion (drawing tension at the time of manufacturing being 40 g), a graph G320 indicates the chromatic dispersion characteristics at the first portion having the positive chromatic dispersion characteristics (drawing tension at the time of manufacturing being 90 g) and a graph G330 indicates the mean value of the chromatic dispersions at the first and second portions. The drawing tension can be adjusted by changing the temperature of a molten portion or the drawing speed of a prepared optical fiber preform.

(Sample 2)

Figure 13:
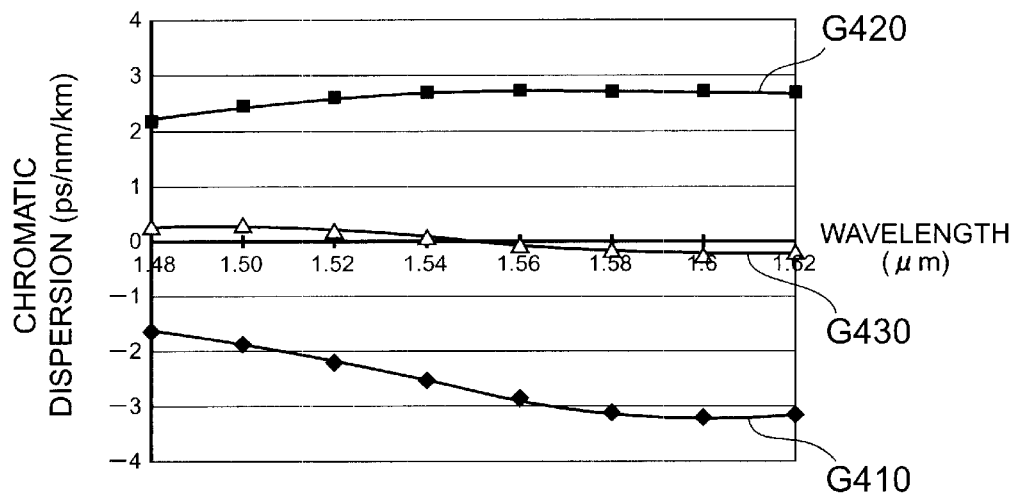
FIG. 13 is a graph respectively showing the chromatic dispersion characteristics of a first portion (portion having a positive chromatic dispersion), the chromatic dispersion characteristics of a second portion (portion having a negative chromatic dispersion) and the mean value of these chromatic dispersion characteristics of the dispersion-managed optical fiber (sample 2) having the refractive index profile shown in FIG. 8.

The dispersion-managed optical fiber according to a sample 2 has the refractive index profile 1400 of the multi-core type shown in FIG. 8 (fourth embodiment). In this sample 2, the first core has the outer diameter $2a$ of 6.0 $\mu$m and the relative refractive index difference of 0.47% with respect to the outer cladding. The second core has the outer diameter $2b$ of 17.5 $\mu$m and the relative refractive index difference of $-0.18\%$ with respect to the outer cladding. The third core has the outer diameter $2c$ of 25.0 $\mu$m and the relative refractive index difference of 0.24%–0.28% with respect to the outer cladding. The inner cladding has the outer diameter $2d$ of 50.0 $\mu$m and the relative refractive index difference of $-0.18\%$ with respect to the outer cladding. Here, the relative refractive index difference of the third core substantially comprised of pure silica glass with respect to the outer cladding largely depends on the drawing tension at the time of manufacturing. Accordingly, by changing this drawing tension periodically, portions where sign of the generated chromatic dispersion becomes different can be alternately formed in the continuous optical fiber. FIG. 13 shows the chromatic dispersion characteristics at respective portions of this sample 2, wherein a graph G410 indicates the chromatic dispersion characteristics at the second portion having the negative chromatic dispersion (drawing tension at the time of manufacturing being 60 g), a graph G420 indicates the chromatic dispersion characteristics at the first portion having the positive chromatic dispersion characteristics (drawing tension at the time of manufacturing being 90 g) and a graph G430 indicates the mean value of the chromatic dispersions at the first and second portions.

(Sample 3)

Figure 14:
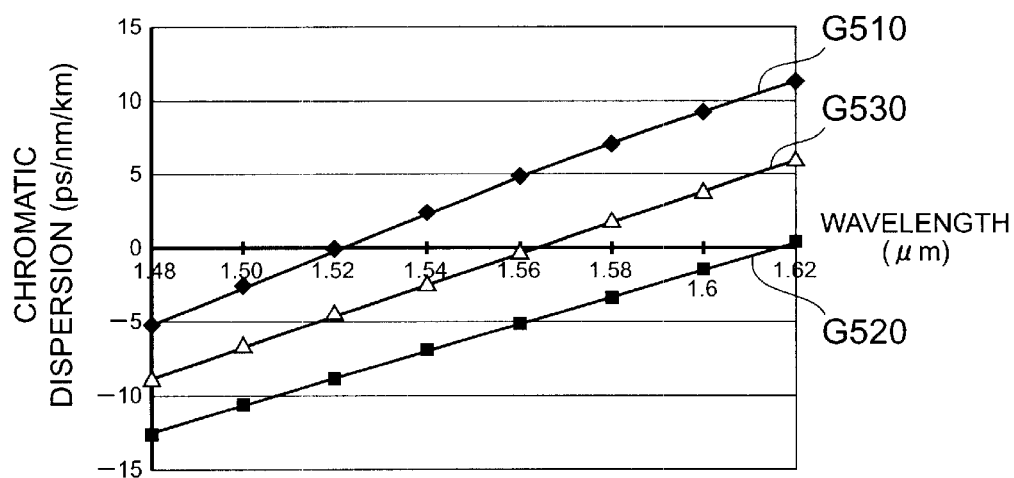
FIG. 14 is a graph respectively showing the chromatic dispersion characteristics of a first portion (portion having a positive chromatic dispersion), the chromatic dispersion characteristics of a second portion (portion having a negative chromatic dispersion) and the mean value of these chromatic dispersion characteristics of the dispersion-managed optical fiber (sample 3) having the refractive index profile shown in FIG. 5B.

The dispersion-managed optical fiber according to a sample 3 has the refractive index profile 1100 of the multi-core type shown in FIG. 5B (first embodiment). In this sample 3, the first core has the outer diameter $2a$ of 4.9 $\mu$m and the relative refractive index difference of 0.90% with respect to the cladding region.. The second core has the outer diameter $2b$ of 8.7 $\mu$m and the relative refractive index difference of 0% to the cladding region. The third core has the outer diameter $2c$ of 13.6 $\mu$m and the relative refractive index difference of 0.12%–0.33% with respect to the cladding region. Here, the relative refractive index difference of the third core which is substantially comprised of pure silica glass to the cladding region largely depends on the drawing tension at the time of manufacturing. Accordingly, by changing this drawing tension periodically, portions where sign of the generated chromatic dispersion becomes different can be alternately formed in the continuous optical fiber. FIG. 14 shows the chromatic dispersion characteristics at respective portions of this sample 3, wherein a graph G510 indicates the chromatic dispersion characteristics at the second portion having the positive chromatic dispersion (drawing tension at the time of manufacturing being 30 g), a graph G520 indicates the chromatic dispersion characteristics at the first portion having the negative chromatic dispersion characteristics (drawing tension at the time of manufacturing being 150 g) and a graph G530 indicates the mean value of the chromatic dispersions at the first and second portions.

(Sample 4)

Figure 15:
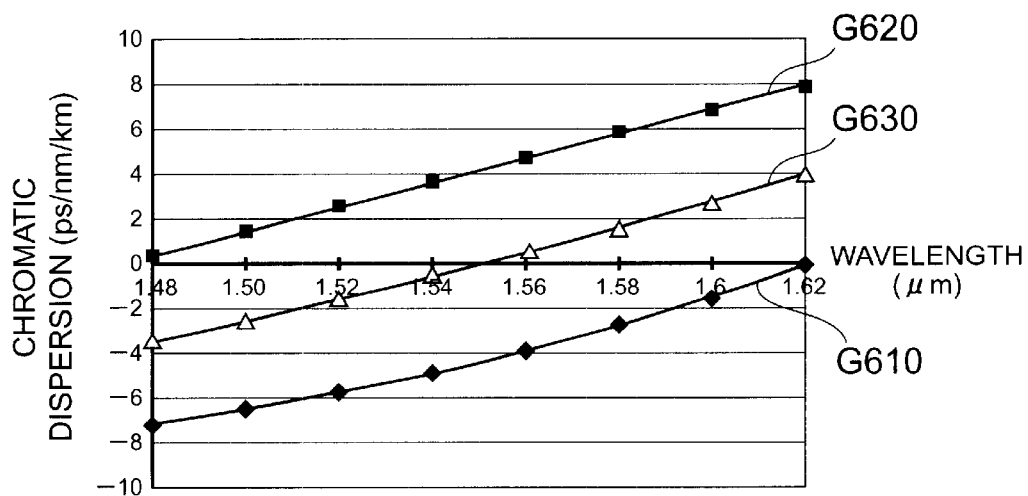
FIG. 15 is a graph respectively showing the chromatic dispersion characteristics of a first portion (portion having a positive chromatic dispersion), the chromatic dispersion characteristics of a second portion (portion having a negative chromatic dispersion) and the mean value of these chromatic dispersion characteristics of the dispersion-managed optical fiber (sample 4) having the refractive index profile shown in FIG. 6.

The dispersion-managed optical fiber according to a sample 4 has the refractive index profile 1200 of the multi-core type shown in FIG. 6 (second embodiment). In this sample 4, the first core has the outer diameter 2a of 6.8 μm and the relative refractive index difference of 0.64% to the outer cladding. The second core has the outer diameter 2b of 17.4 μm and the relative refractive index difference of 0% to the outer cladding. The third core has the outer diameter 2c of 27.2 μm and the relative refractive index difference of 0.07%–0.20% to the outer cladding. The inner cladding has the outer diameter 2d of 40.8 μm and the relative refractive index difference of −0.10% to the outer cladding. Here, the relative refractive index difference of the third core which is substantially comprised of pure silica glass to the outer cladding largely depends on the drawing tension at the time of manufacturing. Accordingly, by changing this drawing tension periodically, portions where sign of the generated chromatic dispersion becomes different can be alternately formed in the continuous optical fiber. FIG. 15 shows the chromatic dispersion characteristics at respective portions of this sample 4, wherein a graph G610 indicates the chromatic dispersion characteristics at the second portion having the negative chromatic dispersion (drawing tension at the time of manufacturing being 40 g), a graph G620 indicates the chromatic dispersion characteristics at the first portion having the positive chromatic dispersion characteristics (drawing tension at the time of manufacturing being 100 g) and a graph G630 indicates the mean value of the chromatic dispersions at the first and second portions.

(Sample 5)

Figure 16:
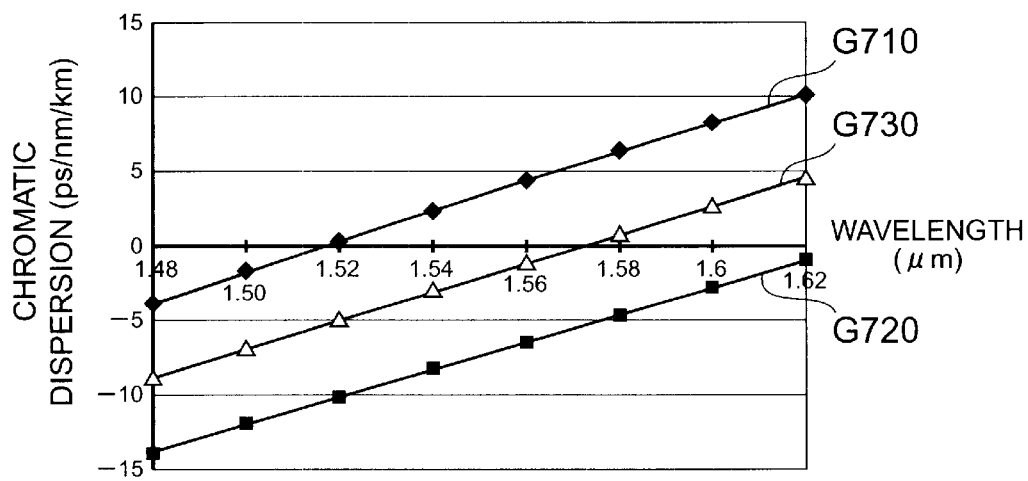
FIG. 16 is a graph respectively showing the chromatic dispersion characteristics of a first portion (portion having a positive chromatic dispersion), the chromatic dispersion characteristics of a second portion (portion having a negative chromatic dispersion) and the mean value of these chromatic dispersion characteristics of the dispersion-managed optical fiber (sample 5) having the refractive index profile shown in FIG. 9.

The dispersion-managed optical fiber according to a sample 5 has the refractive index profile 1500 of the double-core type shown in FIG. 9 (fifth embodiment). In this sample 5, the first core has the outer diameter 2a of 4.3 μm and the relative refractive index difference of 0.95% to the cladding region. The second core has the outer diameter 2b of 18.0 μm and the relative refractive index difference of 0.04%–0.20% with respect to the cladding region. Here, the relative refractive index difference of the second core substantially comprised of pure silica glass with respect to the cladding region largely depends on the drawing tension at the time of manufacturing. Accordingly, by changing this drawing tension periodically, portions where sign of the generated chromatic dispersion becomes different can be alternately formed in the continuous optical fiber. FIG. 16 shows the chromatic dispersion characteristics at respective portions of this sample 5, wherein a graph G710 indicates the chromatic dispersion characteristics at the first portion having the positive chromatic dispersion (drawing tension at the time of manufacturing being 30 g), a graph G720 indicates the chromatic dispersion characteristics at the second portion having the negative chromatic dispersion characteristics (drawing tension at the time of manufacturing being 100 g) and a graph G730 indicates the mean value of the chromatic dispersions at the first and second portions.

Figure 20:
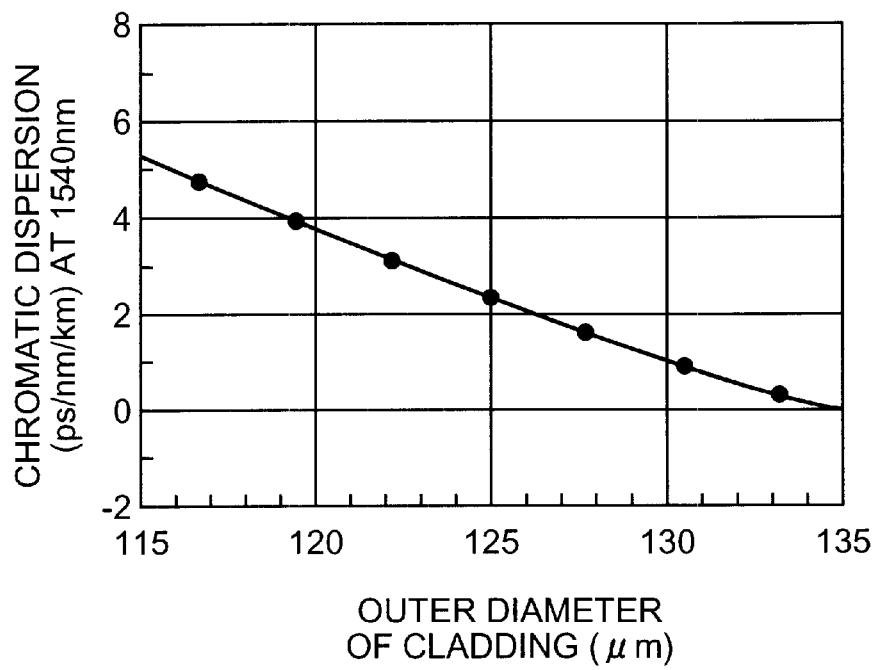
FIG. 20 is a graph showing the relationship between the outer diameter of cladding (diameter of fiber) and the chromatic dispersion in the dispersion-managed optical fiber according to the present invention.
Figure 21:
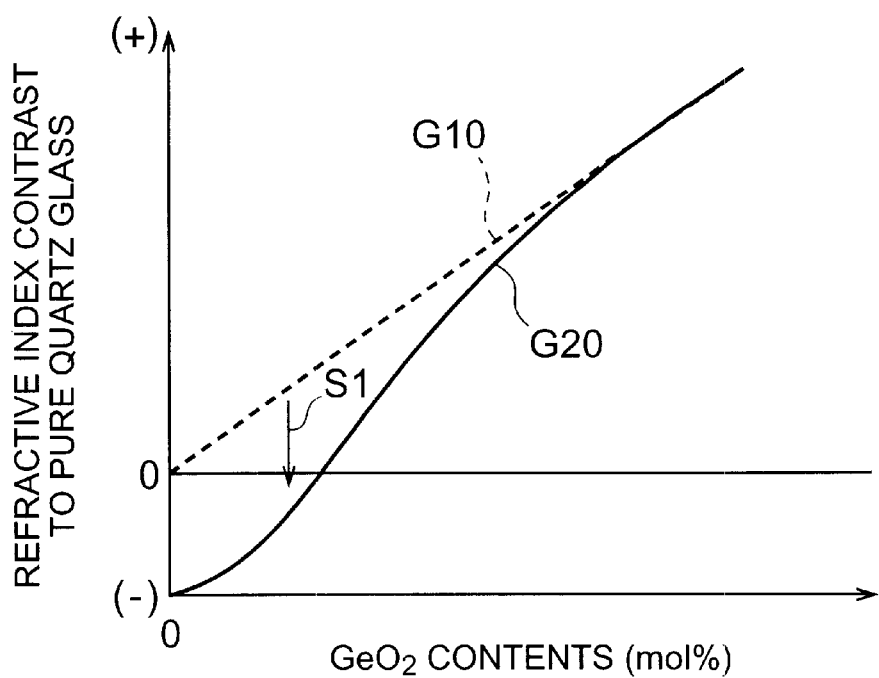
FIG. 21 is a graph explaining the influence of applying the residual stress to a glass material containing $GeO_2$.

Further, FIG. 20 shows the dependency of the chromatic dispersion at the wavelength 1540 nm on the outer diameter of the fiber (corresponding to the outer diameter of the cladding) with respect to the dispersion-managed optical fiber of this fifth sample when drawn with a tension of 30 g. Since the outer diameter of the core is changed in response to the change of the outer diameter of the fiber, as shown in FIG. 20, the chromatic dispersion at the wavelength 1540 nm is changed depending on the change of the outer diameter of the cladding. Accordingly, it becomes possible to enhance the freedom of adjustment of the chromatic dispersion by a coupled use of the change of tension at the time of drawing and the change of the outer diameter of the fiber.

As an example, assume a case in which the difference of chromatic dispersion between the first portion having the positive chromatic dispersion and the second portion having the negative chromatic dispersion is required to be enlarged. When the outer diameter of the fiber is changed from 125 μm to 120 μm at the first portion having the positive chromatic dispersion (drawing tension at the time of manufacturing being 30 g), the chromatic dispersion generated at the first portion is changed from 2.34 ps/nm/km to 3.80 ps/nm/km so that it becomes possible to enlarge the difference of chromatic dispersion between the first portion having the positive chromatic dispersion and the second portion having the negative chromatic dispersion (drawing tension at the time of manufacturing being 100 g). In this example, the case in which the outer diameter of the fiber at the portion having the small drawing tension is made small is explained. However, the portion where the outer diameter of the fiber is changed is not limited to the portion having the small drawing tension at the time of manufacturing and the change of the outer diameter of the fiber is not limited to the change in the direction to reduce the diameter.

(Sample 6)

Figure 17:
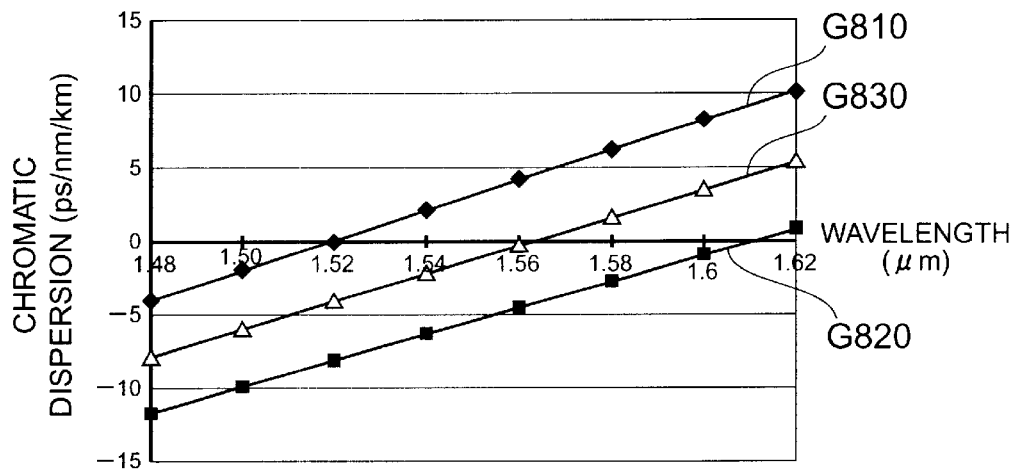
FIG. 17 is a graph respectively showing the chromatic dispersion characteristics of a first portion (portion having a positive chromatic dispersion), the chromatic dispersion characteristics of a second portion (portion having a negative chromatic dispersion) and the mean value of these chromatic dispersion characteristics of the dispersion-managed optical fiber (sample 6) having the refractive index profile shown in FIG. 10.

The dispersion-managed optical fiber according to a sample 6 has the refractive index profile 1600 of the double-core type shown in FIG. 10 (sixth embodiment). In this sample 6, the first core has the outer diameter 2a of 4.4 μm and the relative refractive index difference of 0.86% with respect to the outer cladding. The second core has the outer diameter 2b of 22.8 μm and the relative refractive index difference of 0.02%–0.16% with respect to the outer cladding. The inner cladding has the outer diameter 2c of 34.0 μm and the relative refractive index difference of −0.05% with respect to the outer cladding. Here, the relative refractive index difference of the second core substantially comprised of pure silica glass with respect to the outer cladding largely depends on the drawing tension at the time of manufacturing. Accordingly, by changing this drawing tension periodically, portions where sign of the generated chromatic dispersion becomes different can be alternately formed in the continuous optical fiber. FIG. 17 shows the chromatic dispersion characteristics at respective portions of this sample 6, wherein a graph G810 indicates the chromatic dispersion characteristics at the second portion having the positive chromatic dispersion (drawing tension at the time of manufacturing being 40 g), a graph G820 indicates the chromatic dispersion characteristics at the first portion having the negative chromatic dispersion characteristics (drawing tension at the time of manufacturing being 140 g) and a graph G830 indicates the mean value of the chromatic dispersions at the first and second portions.

(Sample 7)

Figure 18:
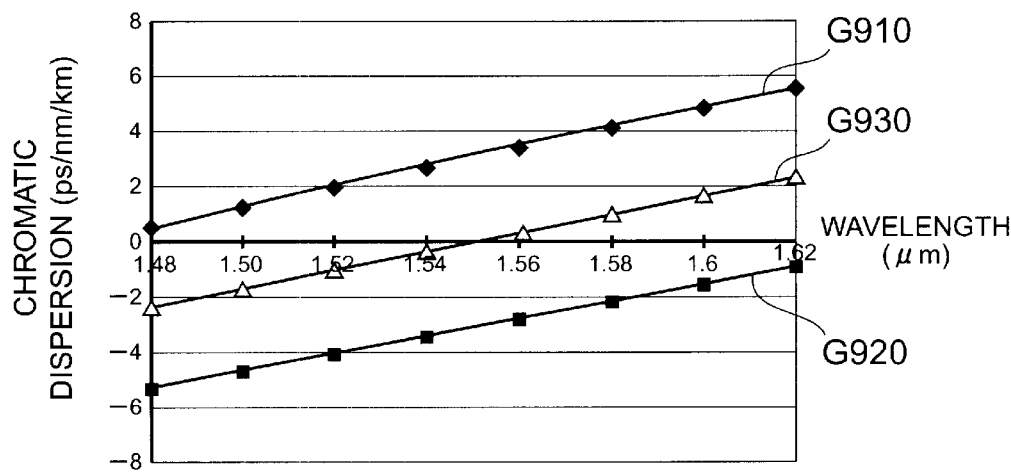
FIG. 18 is a graph respectively showing the chromatic dispersion characteristics of a first portion (portion having a positive chromatic dispersion), the chromatic dispersion characteristics of a second portion (portion having a negative chromatic dispersion) and the mean value of these chromatic dispersion characteristics of the dispersion-managed optical fiber (sample 7) having the refractive index profile shown in FIG. 11.

The dispersion-managed optical fiber according to a sample 7 has the refractive index profile 1700 of the W-type shown in FIG. 11 (seventh embodiment). In this sample 7, the core region of a single layer has the outer diameter 2a of 5.3 μm and the relative refractive index difference of 0.46%–0.59% with respect to the outer cladding. The inner cladding has the outer diameter 2b of 11.0 μm and the relative refractive index difference of −0.13% with respect to the outer cladding. Here, the relative refractive index difference of the core region substantially comprised of pure silica glass with respect to the outer cladding largely depends on the drawing tension at the time of manufacturing. Accordingly, by changing this drawing tension periodically, portions where sign of the generated chromatic dispersion becomes different can be alternately formed in the continuous optical fiber. FIG. 18 shows the chromatic dispersion characteristics at respective portions of this sample 7, wherein a graph G910 indicates the chromatic dispersion characteristics at the second portion having the positive chromatic dispersion (drawing tension at the time of manufacturing being 40 g), a graph G920 indicates the chromatic dispersion characteristics at the first portion having the negative chromatic dispersion characteristics (drawing tension at the time of manufacturing being 110 g) and a graph G930 indicates the mean value of the chromatic dispersions at the first and second portions.

FIG. 19 is a table which sums up various characteristics of the dispersion-managed optical fibers respectively related with the above-mentioned samples 1–7. With respect to samples 1–7 and respective drawing tensions thereof, this table shows the relative refractive index difference (%) and the outer diameter (μm) of the first core, the relative refractive index difference (%) and the outer diameter (μm) of the second core, the relative refractive index difference (%) and the outer diameter (μm) of the third core, the relative refractive index difference (%) and the outer diameter (μm) of the inner cladding, the chromatic dispersions (ps/nm/km) at respective wavelengths 1.53 μm, 1.54 μm, 1.56 μm and 1.60 μm, the dispersion slope (ps/nm$^2$/km) at the wavelength of 1.55 μm the effective area (μm$^2$) at the wavelength of 1.55 μm, the cut-off wavelength (μm), the macrobend loss (dB/m) with diameter 20 mm at the wavelength of 1.55 μm and the polarization mode dispersion PMD (ps·km$^{-1/2}$) at the wavelength of 1.55 μm. Further, the respective means chromatic dispersion (ps/nm/km) at the wavelength 1.53 μm, 1.54 μm, 1.56 μm and 1.60 μm are also shown in the table. Here, the mean chromatic dispersion is the chromatic dispersion of the whole dispersion-managed optical fiber when the total cumulative length of the first portions having the positive chromatic dispersion is made equal to the total cumulative length of the second portions having the negative chromatic dispersion. Following conclusions can be obtained from the table shown in FIG. 19.

That is, in any one of the above-mentioned samples 1 to 7, in the glass layer substantially comprised of pure silica glass of the core region, the residual stress is changed corresponding to the drawing tension and the refractive index and also the chromatic dispersion is changed corresponding to this change of the residual stress. That is, the first portion and the second portion in the dispersion-managed optical fiber are classified by changing the drawing tension, at the signal wavelength band of 1.53 μm–1.60 μm. Further, in any one of samples, at the signal wavelength band, the chromatic dispersion of the first portion is not less than +1 ps/nm/km but not more than +10 ps/nm/km and the chromatic dispersion of the second portion is not less than −10 ps/nm/km but not more than −1 ps/nm/km. Further, in any one of samples, the mean chromatic dispersion when viewed as a whole, at predetermined wavelengths within the signal wavelength band, is zero.

In the samples 1, 2, 4 and 7, the absolute value of the means chromatic dispersion when viewed as a whole, at the signal wavelength band of 1.53 μm–1.60 μm, is not more than 3 ps/nm/km, and in the samples 3, 5 and 6, the absolute value of the means chromatic dispersion when viewed as a whole, at the signal wavelength band of 1.54 μm–1.56 μm, is not more than 3 ps/nm/km.

In the samples 1 and 2, at the wavelength of 1.55 μm, the dispersion slope in the first portion is positive and the dispersion slope in the second portion is negative. Further, the mean chromatic dispersion of the whole dispersion-managed optical fiber of these samples 1 and 2, at the signal wavelength band is set to be smaller than that of other samples.

In any one of samples 1–7, the dispersion-managed optical fiber has the effective area of not less than 40 μm$^2$ at the wavelength of 1.55 μm and has the polarization mode dispersion of not more than 0.2 ps·km$^{-1/2}$ at the wavelength of 1.55 μm.

Except for three cases, that is, a case in which the cut-off wavelength is 1.85 μm at the second portion in the sample 4 (the drawing tension at the time of manufacturing being 40 g), a case in which the cut-off wavelength is 1.78 μm at the first portion in the sample 5 (the drawing tension at the time of manufacturing being 30 g) and a case in which the cut-off wavelength is 1.84 μm at the first portion in the sample 6 (the drawing tension at the time of manufacturing being 40 g), in the first portion and the second portion of each sample, the single mode condition at the signal wavelength band of 1.53 μm–1.60 μm is satisfied. However, even with respect to the above-mentioned three cases, in the whole dispersion-managed optical fiber where the first portions and the second portions are alternately arranged, the single mode condition at the signal wavelength band 1.53 μm–1.60 μm is satisfied. Further, the macrobend loss with the radius of curvature of 20 mm at the wavelength of 1.55 μm is sufficiently small except for the sample 7 where the macrobend loss at the second portion in the sample 7 (the drawing tension at the time of manufacturing being 110 g) is 82 dB/m.

As described above, according to the dispersion-managed optical fiber of the present invention, amounts of the residual stresses intentionally given to the respective portions are controlled. Usually, the relative refractive index difference of the glass material, in which GeO$_2$ is added, with respect to pure silica glass is changed in proportion to a doped amount of GeO$_2$ (mol %) indicated by a graph G10 shown in FIG. 21. However, when the stress strain remains in the inside of the glass material, the graph G10 shifts in the direction shown in an arrow S1 relative to a doped amount of GeO$_2$ (a graph G20). According to the present invention, the adjustment is made such that, by intentionally giving the stress strain to the inside of the optical fiber to be manufactured, even when GeO$_2$ is unintentionally added into the glass layer (pure silica glass layer) which should not contain GeO$_2$ during the manufacturing, the relative refractive index difference of this layer, to which the residual stress is given, with respect to pure silica glass is made lower than the relative refractive index difference of this glass layer doped with GeO$_2$ whose amount is equal to the amount of the added GeO$_2$, with respect to the pure silica glass. Although the residual stress is applied to the inside of the optical fiber to be manufactured by adjusting the drawing tension at the time of manufacturing, the residual stress may be given by an oscillatory drawing.

In this manner, the dispersion-managed optical fiber according to the present invention is provided with the structure in which the dopant concentration is set to the uniform state along the longitudinal direction of the dispersion-managed optical fiber and the refractive index or the residual stress in the glass layer which is not doped with GeO$_2$ is changed along the longitudinal direction of the dispersion-managed optical fiber. Accordingly, without changing the cross-sectional dimension of the dispersion-managed optical fiber in the longitudinal direction thereof, the continuous dispersion-managed optical fiber in which the portions having the positive chromatic dispersion at a predetermined wavelength and the portions having the negative chromatic dispersion at a predetermined wavelength are alternately arranged can be obtained.

Figure 22:
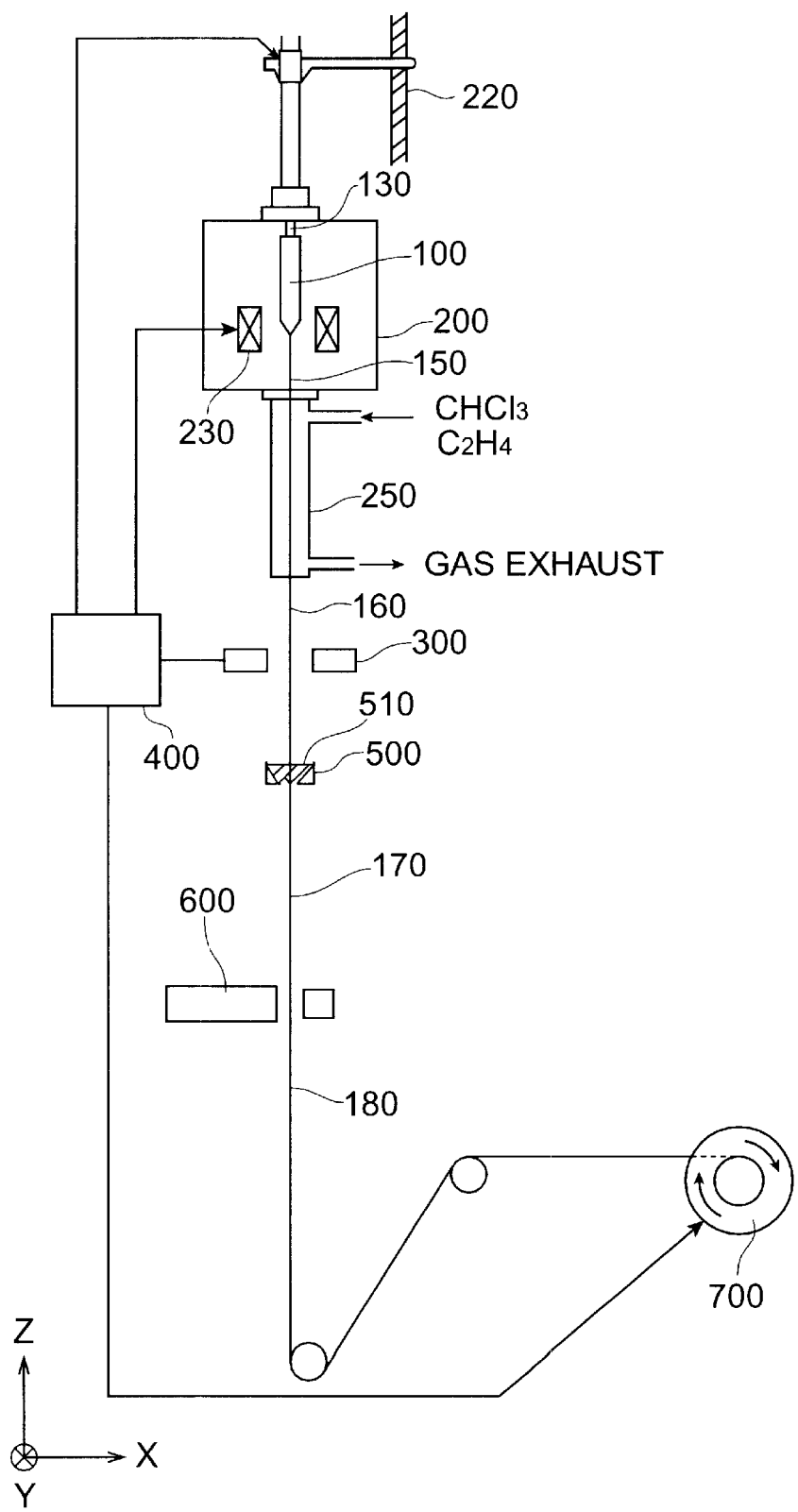
FIG. 22 is a view showing a schematic structure (the first embodiment) of a manufacturing device for manufacturing the dispersion-managed optical fiber according to the present invention.

Subsequently, the method of manufacturing the dispersion-managed optical fiber according to the present invention is explained hereinafter. FIG. 22 is a view showing a first embodiment of a manufacturing device to obtain the dispersion-managed optical fiber according to the present invention.

As shown in FIG. 22, in the manufacturing of the optical fiber, first of all, an optical fiber preform 100 to be drawn is prepared. This optical fiber preform 100 contains silica glass as a main component and has a predetermined refractive index profile (see FIG. 5A and FIG. 6–FIG. 11). Further, the optical fiber preform 100 can be produced by a vapor phase axial deposition technique (VAD technique), an outer vapor deposition technique (OVD technique), an inner vapor deposition technique (MCVD technique) or a rod-in-tube technique.

The prepared optical fiber preform 100 has the dopant concentration in a region containing a dopant for refractive index adjustment among regions corresponding to a plurality of glass layers in the dispersion-managed optical fiber made uniform such that the maximum change along the longitudinal direction of the optical fiber preform 100 becomes not more than 20%–30%, and more preferably not more than 10%. Further, in the prepared optical fiber preform 100, the respective refractive indices of the regions corresponding to a plurality of glass layers of the dispersion-managed optical fiber to pure silica glass may be made uniform such that their maximum changes along the longitudinal direction of the optical fiber preform 100 become not more than 20%–30%.

Subsequently, the optical fiber preform 100 is mounted on a dummy rod 130. By moving the dummy rod 130 toward a heater 230 by means of a preform leader 220, the optical fiber preform 100 mounted on the dummy rod 130 is introduced into the heater 230. Then, by drawing a lower end of the optical fiber preform 100 (FIG. 23A) heated by the heater 230, a naked fiber 150 (FIG. 23B) can be obtained.

The naked fiber 150 obtained by the drawing subsequently passes through the inside of a reaction tube 250 for forming a carbon coating. Into the inside of the reaction tube 250, a mixed gas containing carbon halide (CHCl$_3$, CCl$_4$ or the like) and hydrocarbon (C$_2$H$_4$, C$_3$H$_8$, C$_6$H$_6$ or the like) is supplied and the carbon halide and the hydrocarbon in the mixed gas react on the surface of the naked fiber 150 so that the surface of the naked fiber 150 is coated with a hermetic coating (carbon coating) 151 containing carbon as a main component. It is unnecessary to coat the hermetic coating 151.

A carbon coated fiber 160 (see FIG. 23C) which is coated with the carbon coating 151 has the outer diameter thereof measured by a laser outer diameter measuring instrument 300. Based on the measured result of the laser outer diameter measuring instrument 300, a control system 400 controls the heating temperature and the drawing speed such that the outer diameter of the carbon coated fiber 160 becomes a predetermined value (usually 125 $\mu$m).

The carbon coated fiber 160 which passed through the laser outer diameter measuring instrument 300 subsequently passes through the inside of a resin 510 in a liquid form stored in a resin coating die 500 and hence, the resin is adhered to the surface of the carbon coated fiber 160 (a resin adhered fiber 170 being generated). Thereafter, the resin adhered fiber 170 passes through an UV lamp 600. Here, the resin adhered to the surface of the carbon coated fiber 160 is cured by the irradiation of ultraviolet rays from the UV lamp 600. Accordingly, an optical fiber 180 (an optical cord) which is produced by coating the surface of the carbon coated fiber 160 with a resin film 161 can be obtained and the optical fiber 180 is wound around a drum 700.

Figure 23A:
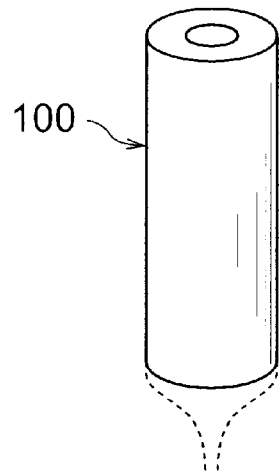
FIG. 23A–FIG. 23C are views showing the cross-sectional structures of glass materials at respective parts of the manufacturing device shown in FIG. 22.
Figure 23B:
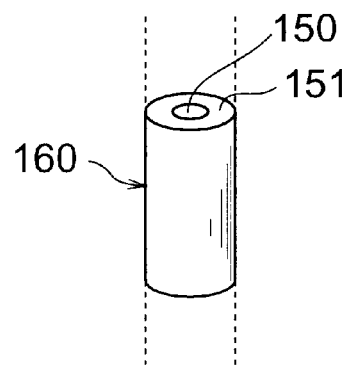
Figure 23C:
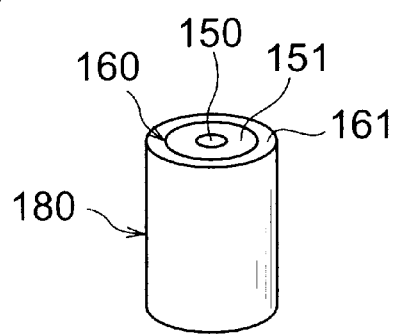

FIG. 23A is a view showing the cross section of the prepared optical fiber preform 100. FIG. 23B is a view which shows a cross section of the carbon coated fiber 160 which is produced by coating the surface of the drawn naked fiber 150 (including a core region and a cladding region) with the carbon coating 151. FIG. 23C is a view which shows a cross section of the optical fiber 180 as a final product which forms the resin film 161 on the surface of the carbon coated fiber 160.

In a method of manufacturing the dispersion-managed optical fiber according to the present invention (first embodiment), at the time of drawing the optical fiber 150 from the optical fiber preform 100, the drawing tension is changed in the longitudinal direction. That is, the drawing with a drawing tension A and the drawing with a drawing tension B are alternately repeated. The change of the drawing tension may be administrated based on the optical fiber length or based on time. Further, the drawing tension may be adjusted by changing the temperature of a molten portion of the optical fiber preform 100 in the inside of a drawing furnace 200 at the time of drawing. Further, the drawing tension can be adjusted by changing the drawing speed. Still further, it is preferable to change the outer diameter of the fiber in synchronous with the change of the drawing tension. In this case, the chromatic dispersion can be adjusted more effectively. The optical fiber 180 obtained in the above-mentioned manner constitutes the previously-mentioned dispersion-managed optical fiber 10 of the present invention.

Aiming at the improvement of the polarization mode dispersion, the optical fibers according to the first and second embodiments may be obtained also by a following oscillatory drawing.

Figure 24:
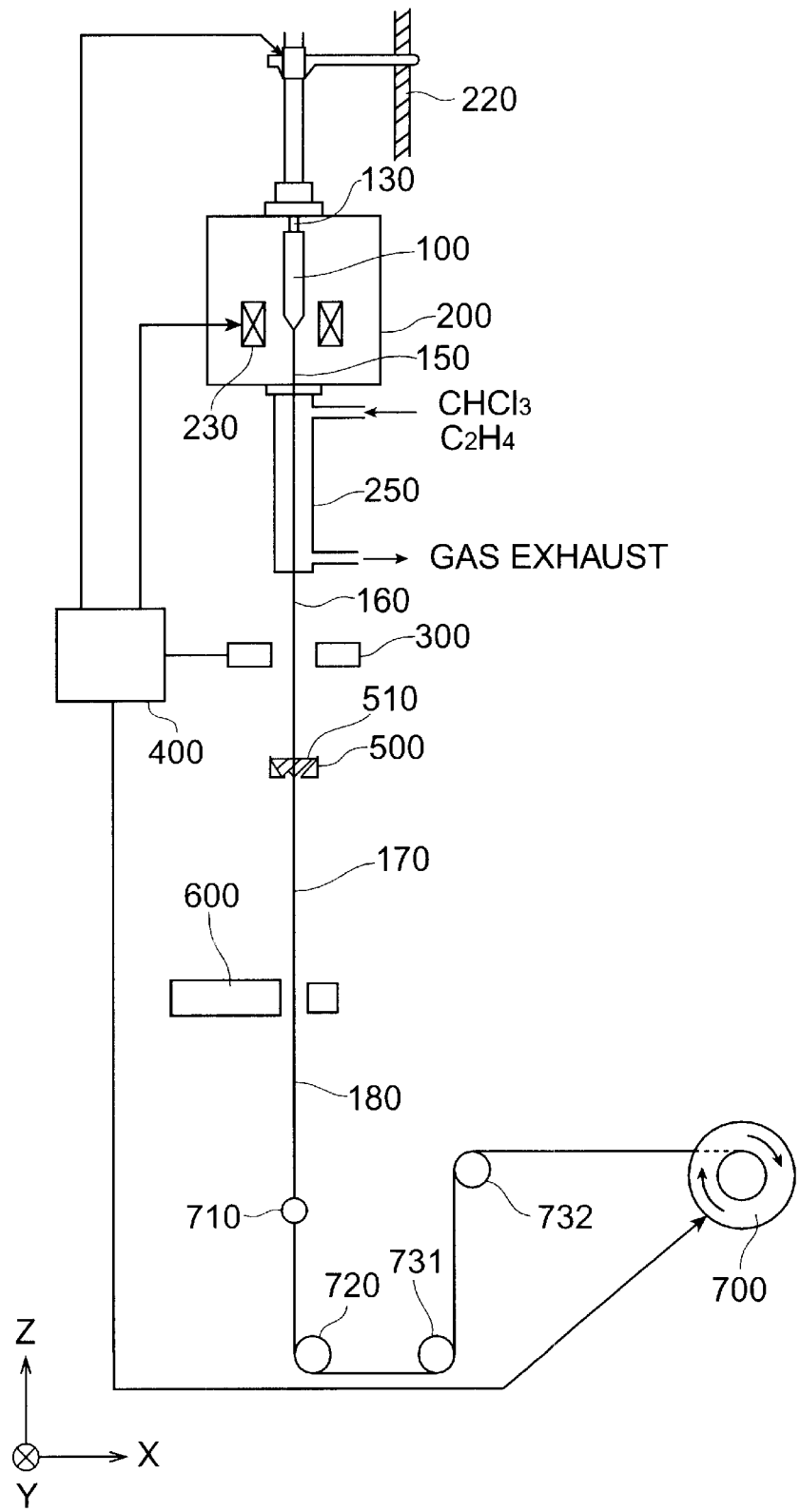
FIG. 24 is a view showing a schematic structure (second embodiment) of a manufacturing device for manufacturing the dispersion-managed optical fiber according to the present invention.

That is, FIG. 24 is a view showing a second embodiment of the manufacturing device for obtaining the dispersion-managed optical fiber according to the present invention. The manufacturing device shown in FIG. 24 is a device which obtains the optical fiber by the oscillatory drawing and hence, the overlapped explanation of parts which are identical with parts of the previously explained first embodiment is omitted.

In the oscillatory drawing, first of all, the optical fiber 180 which passed through the UV lamp 600 passes through a pair of guide rollers 710 for suppressing the corresponding movement of the optical fiber which rotates freely such that the rollers do not obstruct the progress of the optical fiber 180. Then, the optical fiber 180 is sequentially guided by an oscillatory guide roller 720, a first stationary guide roller 731 disposed in a stage next to the oscillatory guide roller 720, and a second stationary guide roller 732 disposed in a stage next to the first stationary guide roller 731. The optical fiber 180 which sequentially passes through the oscillatory guide roller 720, the first stationary guide roller 731 and the second stationary guide roller 732 is wound around the drum 700.

Here, a pair of guide rollers 710 for suppressing the corresponding movement of the optical fiber are disposed at a position 100 mm away from the oscillatory guide roller 720 in the right-above direction (the direction along a Z axis in the drawing) and the distance between a pair of guide rollers 710 is set to 2 mm. Further, the oscillatory guide roller 720 has the roller outer diameter of 150 mm and the roller width of 30 mm. Material of the surface of the roller is aluminum which is the material of the roller per se. A rotary shaft of the oscillatory guide roller 720 is arranged such that the roller is oscillatory at an interval of 100 rpm about a z axis in the drawing (an angle −θ from a y axis crossing an X axis which indicates a direction that the optical fiber 180 is pulled and an angle +θ from a y axis). Further, the first stationary guide roller 731 is arranged at a position which is spaced apart by a distance of 250 mm in the right lateral direction (on a x-y plane in the drawing on which the guide roller 720 is installed) from the oscillatory guide roller 720. In the same manner as the roller of the oscillatory guide roller 720, the first stationary guide roller 731 has the roller outer diameter of 150 mm and the roller width of 30 mm. However, the rotary shaft thereof is fixedly secured and a V-shaped narrow groove is provided in a central portion of a roller surface as means for suppressing the rolling of the optical fiber. Due to the combination of a pair of guide rollers 710 for suppressing the corresponding movement of the optical fiber, the oscillatory guide roller 720 and the first stationary guide roller 731 which are arranged under the above-mentioned conditions, a twisting can be given to the optical fiber 180 effectively, that is, at a high efficiency to the oscillatory speed of the oscillatory guide roller 720.

Figure 25:
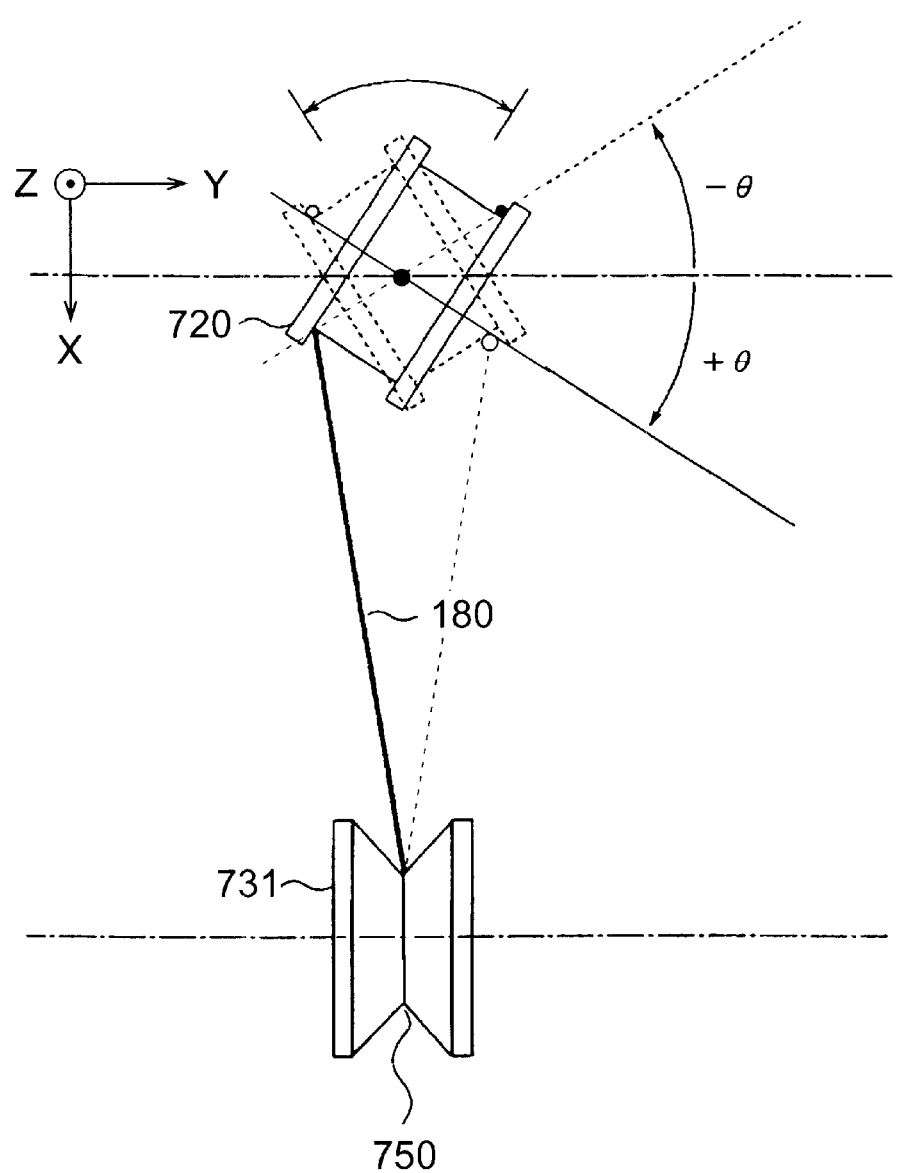
FIG. 25 and FIG. 26 are views explaining the operation of the guide rollers in the manufacturing device shown in FIG. 24.
Figure 26:
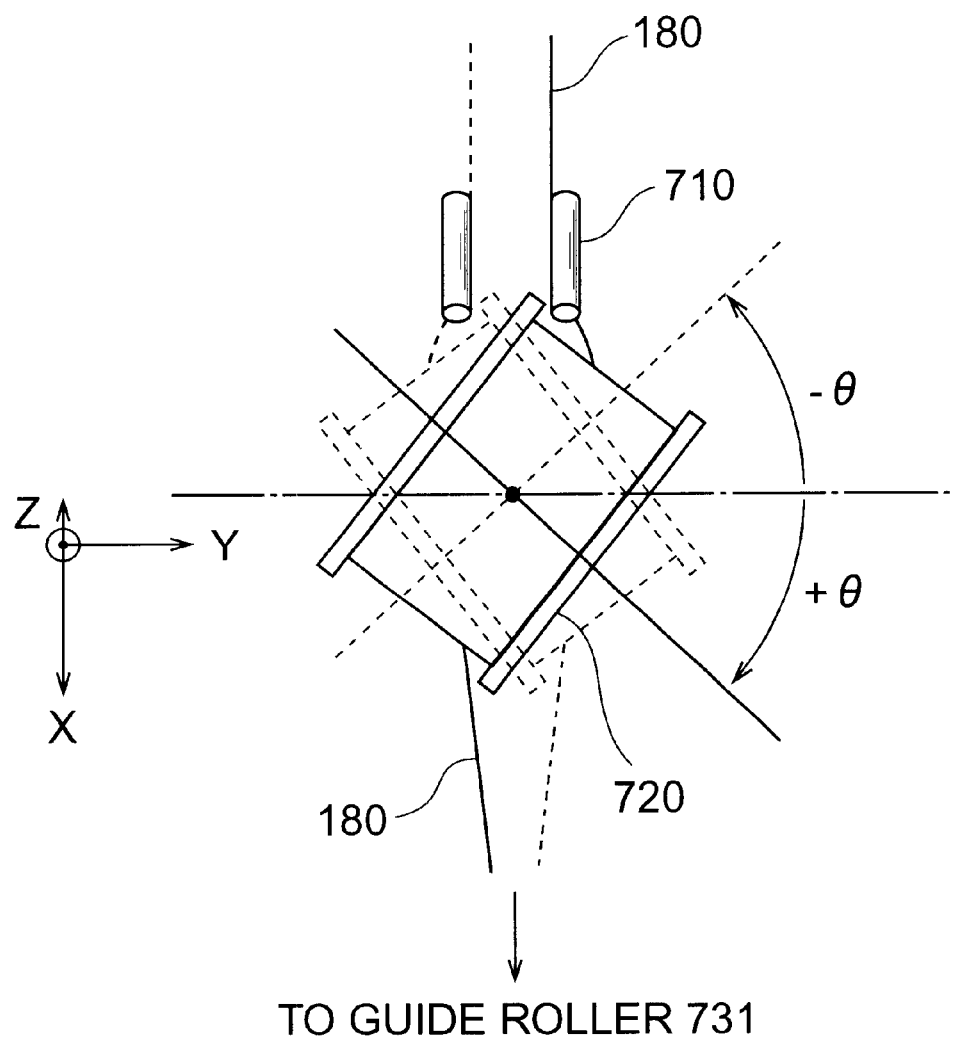

Subsequently, the manner of effectively giving the twisting to the optical fiber 180 is explained in conjunction with FIG. 25 and FIG. 26. Here, FIG. 25 is a view of the oscillatory guide roller 720 and the first stationary guide roller 731 shown in FIG. 24 as seen from a reactor 250 side. Further, FIG. 26 is also a view of a pair of guide rollers 710 for suppressing the corresponding movement of the optical fiber and the oscillatory guide roller 720 shown in FIG. 24 as seen from the reactor 250 side. FIG. 26 is prepared as a view which sees a pair of guide rollers 710 and the oscillatory guide roller 720 from a slightly oblique direction to facilitate the observation of the spatial relationship between a pair of guide rollers 710 and the oscillatory guide roller 720.

As shown in FIG. 25, when the oscillatory guide roller 720 is rotated about the z axis from the y axis by the angle +θ, a force in the direction perpendicular to the z axis is applied to the optical fiber 180 due to such a rotation and hence, the optical fiber 180 rolls on the roller surface of the oscillatory guide roller 720. Due to this rolling, a twisting is given to the optical fiber 180. Subsequently, the oscillatory guide roller 720 is rotated about the z axis from the y axis by the angle −θ in an opposite direction. In this manner, by making the oscillatory guide roller 720 repeat the symmetrical reciprocating movement which oscillates from the angle +θ to the angle −θ about the z axis as shown in arrows in the figure, the twisting in the clockwise direction and the twisting in the counter clockwise direction to the advancing direction of the optical fiber 180 are given to the optical fiber 180 alternately.

Here, the first stationary guide roller 731 disposed in the stage next to the oscillatory guide roller 720 is disposed at the right lateral side of the oscillatory guide roller 720 while having the same roller outer diameter as that of the oscillatory guide roller 720. Accordingly, the length that the optical fiber 180 comes into contact with the roller surface of the oscillatory guide roller 720 becomes substantially equal to the length of the roller periphery corresponding to the peripheral angle 90° of the oscillatory guide roller 720. That is, the optical fiber 180 comes into contact with a roller surface ranging from one side surface to the bottom surface of the oscillatory guide roller 720 and is separated from the lowest bottom portion. Accordingly, a state that the rolling of the optical fiber 180 occurs on the other side surface of the oscillatory roller 720 and this rolling obstructs the rolling of the optical fiber 180 on one side surface of the oscillatory roller 720 and makes the optical fiber 180 slide thereon can be prevented. In this manner, due to the rolling of the optical fiber 180 on one side roller surface of the oscillatory guide roller 720, the twisting is given to the optical fiber 180 with a high efficiency to the oscillatory speed of the oscillatory guide rollers 720.

Further, on the central portion of the roller surface of the first stationary guide roller 731, a V-shaped narrow groove 750 is formed as means for suppressing the rolling of optical fiber. The optical fiber 180 guided by the first stationary guide roller 731 is inserted into this V-shaped narrow groove 750. Accordingly, it becomes possible to prevent a state that the optical fiber 180 rolls on the roller surface of the first stationary guide roller 731 and this obstructs the rolling of the optical fiber 180 on the oscillatory guide roller 720 provided for giving the twisting to the optical fiber 180. Therefore, by preventing the rolling of the optical fiber 180 on the roller surface of the first stationary guide roller 731 by means of the V-shaped narrow groove 750, it becomes possible to give the twisting to the optical fiber 180 to the oscillating speed of the oscillatory guide roller 720 with a high efficiency.

Subsequently, as shown in FIG. 26, when the optical fiber 180 rolls on the roller surface of the oscillatory guide roller 720 by rotating-the oscillatory guide roller 720 about the z axis from the y axis by the angle +θ in FIG. 12, along with this rolling of the optical fiber 180, the fiber portion which is positioned at the reactor 250 side right in front of the oscillatory guide roller 720 also moves in the oscillating direction of the oscillatory guide roller 720 correspondingly. When this corresponding movement of the optical fiber 180 exceeds a fixed range, a twisting amount given to the optical fiber 180 is reduced or it gives rise to a thickness deviation of the optical fiber portion coated with the resin film 161. To the contrary, in the present invention, since a pair of guide rollers 710 are arranged at a position right above the oscillatory guide rollers 720 (a position close to the oscillatory guide rollers 720 along the z axis), when the corresponding movement of the optical fiber 180 reaches or exceeds a fixed value, the optical fiber 180 comes into contact with one of a pair of guide rollers 710 so that the further corresponding movement of the optical fiber 180 can be prevented. In this manner, by suppressing the corresponding movement of the optical fiber 180 with a pair of guide rollers 710, the reduction of the twisting amount given to the optical fiber 180 and the thickness deviation of the optical fiber portion coated with the resin film 161 can be effectively suppressed.

In this manner, according to the manufacturing device of the second embodiment shown in FIG. 24, since a pair of guide rollers 710 for suppressing corresponding movement of the optical fiber, the oscillatory guide roller 720 and the first stationary guide roller 731 are combined, the oscillatory guide roller 720, due to its oscillatory movement, makes the optical fiber 180 roll on the roller surface of the oscillatory guide roller 720 and gives the clockwise twisting and the counter clockwise twisting to the optical fiber 180 alternately. Further, a pair of guide rollers 710 for suppressing corresponding movement of the optical fiber and the first stationary guide roller 731 provided with the optical fiber rolling, suppressing means function such that they assist the smooth rolling of the optical fiber 180 on the roller surface of the oscillatory guide roller 720. Accordingly, it becomes possible to effectively give the twisting to the optical fiber 180 to the oscillatory speed of the oscillatory guide roller 720.

Further, according to the manufacturing device shown in FIG. 24, at the time of rolling the optical fiber 180 on the roller surface of the oscillatory guide roller 720, due to a pair of guide rollers 710 for suppressing the corresponding movement of the optical fiber, the corresponding movement of the optical fiber 180 is suppressed and hence, the thickness deviation of the optical fiber portion coated with the resin film 161 can be effectively suppressed.

Accordingly, since the optical fiber 180 manufactured by the above-mentioned manufacturing device,is provided with the core region and the cladding region which covers the core region and furthermore the clockwise twisting and the counter clockwise twisting are alternately given to the optical fiber 180, even if the cross-sectional shapes of the core region and the cladding region are not concentric in a perfect circle, the polarization mode dispersion can be suppressed in an equivalent manner with a case in which the cross-sectional shapes of the core region and the cladding region are concentric in a perfect circle from the viewpoint of the whole elongated optical fiber. Further, since the optical fiber 180 can suppress the thickness deviation of the optical fiber portion coated with the resin film 161, it becomes possible to prevent the stress distribution on a cross section of the optical fiber portion (naked fiber 150) from becoming asymmetric so that the strength of the optical fiber 180 when formed into a cable can be enhanced.

In the manufacturing device capable of the oscillatory drawing, the oscillatory movement of the oscillatory guide roller 720 is the symmetric reciprocating movement from the angle −θ to the angle +θ as shown in FIG. 24. However, oscillatory movement of the oscillatory guide roller 720 is not limited to such a movement and may be an asymmetric reciprocating movement which oscillates from the angle 0 to the angle +θ, for example. In this case, the twisting is intermittently given to the optical fiber 180. On the other hand, the oscillatory movement of the oscillatory guide roller 720 may be a symmetric reciprocating movement which oscillates in the direction of the rotating shaft of the oscillatory guide roller 720. In this case, in the same manner as the above-mentioned operation, the clockwise twisting and the counter clockwise twisting are alternately given to the optical fiber 180. Further, in the manufacturing device shown in FIG. 24, the V-shaped narrow groove 750 is provided on the roller surface of the first stationary guide roller 731 as the optical fiber rolling suppressing means of the first stationary guide roller 731. However, in place of this V-shaped narrow groove 750, a U-shaped narrow groove or a recessed narrow groove may be used to obtain the similar effect.

Figure 27:
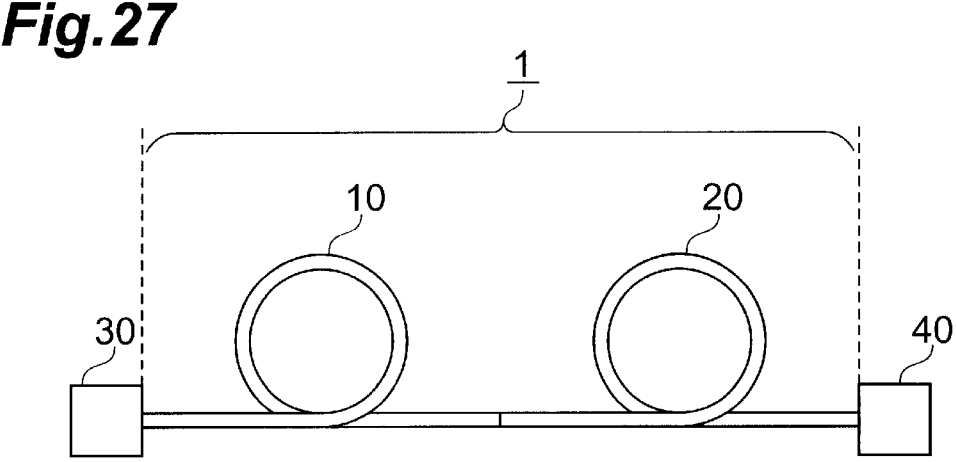
FIG. 27 is a view showing a schematic constitutional view of an optical communication system according to the present invention.

Subsequently, an optical communication system which adopts the dispersion-managed optical fiber according to the present invention is explained. FIG. 27 is a schematic constitutional view of the optical communication system 1 according to the present invention. This optical communication system 1 includes an optical transmission line constituted by longitudinally connecting the dispersion-managed optical fiber 10 and other optical fiber 20. With the use of this optical transmission line, a transmitter (or a repeater) 30 and a receiver (or a repeater) 40 are connected. It is assumed that the interval between the transmitter 30 and the receiver 40 constitutes one repeater spacing.

The optical communication system 1 may apply the dispersion manage optical fiber 10 to the whole optical transmission line (repeater spacing) between the transmitter 30 and the receiver 40. However, the optical communication system 1 may apply the dispersion-managed optical fiber 10 to a portion of the optical transmission line (repeater spacing). In the latter case, it is preferable that the dispersion-managed optical fiber 10 is arranged at the upstream side of the repeater spacing. Due to such an arrangement, that is, by arranging the dispersion-managed optical fiber 10 at the upstream side of the repeater spacing where the power of the signal propagating therethrough is large and the nonlinear optical phenomenon is liable to be generated, the deterioration of the transmission characteristics can be effectively suppressed. Further, by adopting a standard single-mode optical fiber as an optical fiber 20 arranged at the downstream side, the optical communication system 1 can be constituted at a low cost. In the dispersion-managed optical fiber 10 according to the present invention, since the diameter of the fiber is uniform in the longitudinal direction or is slightly changed along the longitudinal direction, the dispersion-managed optical fiber 10 can be easily connected to the other optical fiber 20 and furthermore, the increase of the connection loss can be effectively suppressed.

Figure 28:
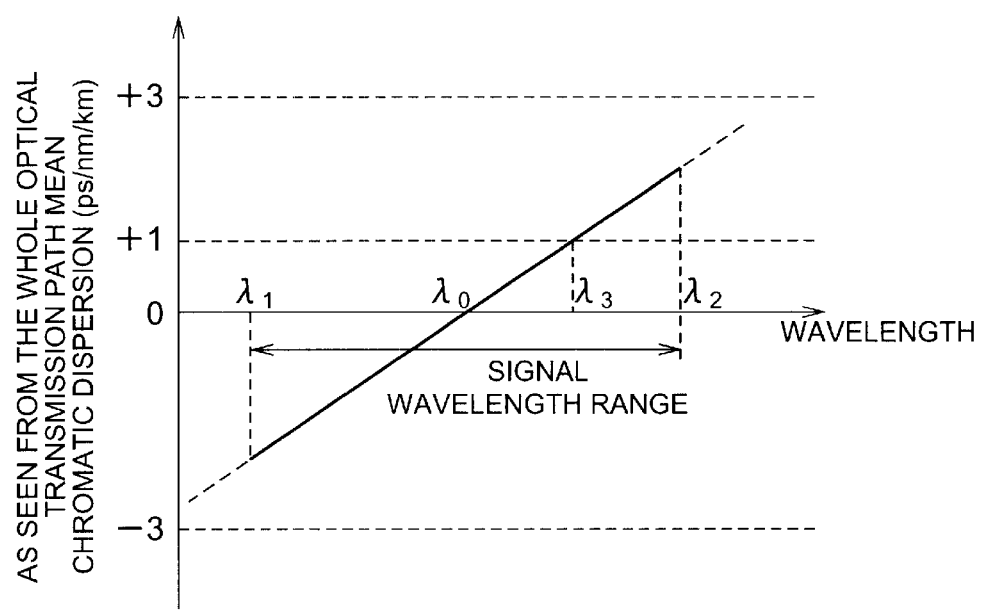
FIG. 28 is a graph showing the mean chromatic dispersion characteristics of an optical transmission in the optical communication system shown in FIG. 27.

FIG. 28 is a graph showing the mean chromatic dispersion characteristics of the whole optical transmission line in the optical communication system 1 according to the present invention. In constituting the optical transmission line by longitudinally connecting the dispersion-managed optical fiber 10 and other optical fiber 20 in the above-mentioned manner, it is preferable to set the absolute value of the mean chromatic dispersion from the viewpoint of the whole repeater spacing at the signal wavelength band of λ1–λ2 to not more than 3 ps/nm/km. Further, it is preferable to set the mean chromatic dispersion from the viewpoint of the whole repeater spacing at a predetermined wavelength λ0 within the signal wavelength band λ1–λ2 to substantially zero (to be more specific, −1 to +1 ps/nm/km). Due to such a constitution, the deterioration of the transmission characteristics caused by the interaction between the cumulative chromatic dispersion and the nonlinear optical phenomenon in the optical transmission line can be effectively suppressed so that an optical transmission line suitable for the WDM transmission through which signals of a plurality of channels propagate can be obtained. Further, by setting the mean chromatic dispersion from the viewpoint of the whole repeater spacing at a predetermined wavelength λ3 within the signal wavelength band λ1–λ2 to not less than 0.1 ps/nm/km but not more than 1.0 ps/nm/km, an optical transmission line suitable for soliton communication which uses the signal of the wavelength λ3 can be obtained.

As has been described heretofore, according to the present invention, the dispersion-managed optical fiber is constituted such that the dopant concentration is uniform along the longitudinal direction thereof and the refractive index or the residual stress of the glass layer which does not contain $GeO_2$ as the dopant is changed along the longitudinal direction thereof. Further, due to such a change of the refractive index or the residual stress along the longitudinal direction, the adjustment is made such that the sign of the chromatic dispersion generated at respective portions is alternately switched and hence, the cross-sectional dimension of the dispersion-managed optical fiber can be made uniform along the longitudinal direction. Accordingly, it becomes possible to obtain the dispersion-managed optical fiber which can be easily manufactured and has the structure which ensures an easy connection with other optical fiber without giving rise to the increase of the connection loss.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-managed optical fiber ensuring its single mode at a predetermined wavelength within a signal wavelength band, in which one or more first portions having a positive chromatic dispersion at the predetermined wavelength and one or more second portions having a negative chromatic dispersion at the predetermined wavelength are arranged alternately and adjacent to each other, said dispersion-managed optical fiber comprising a plurality of glass layers sequentially provided in a radial direction, wherein a dopant concentration of a glass layer doped with a dopant for adjustment of refractive index, out of said plurality of glass layers, is made uniform such that a maximum change of dopant concentration along a longitudinal direction of said dispersion-managed optical fiber is suppressed to not more than 20–30%, and wherein, a refractive index of a glass layer not substantially contained with $GeO_2$ as the dopant, out of said plurality of glass layers, is changed along the longitudinal direction of said dispersion-managed optical fiber.

2. A dispersion-managed optical fiber according to claim 1, wherein the dopant concentration of said glass layer doped with the dopant for adjustment of refractive index, out of said plurality of glass layers, is made uniform such that the maximum change of dopant concentration along the longitudinal direction of said dispersion-managed optical fiber is suppressed to not more than 10%.

3. A dispersion-managed optical fiber according to claim 1, wherein said glass layer not substantially contained with $GeO_2$ as the dopant, out of said plurality of glass layers, includes a layer of pure silica glass.

4. A dispersion-managed optical fiber according to claim 1, wherein a relative refractive index difference of said glass layer not substantially contained with $GeO_2$ as the dopant, out of said plurality of glass layers, with respect to pure silica glass is adjusted such that the relative refractive index difference of said glass layer becomes lower than that of a glass non-intentionally doped with $GeO_2$ having an amount equal to an amount of $GeO_2$ in said glass layer with respect to pure silica glass.

5. A dispersion-managed optical fiber according to claim 1, wherein the signal wavelength band is 1.53 $\mu$m–1.60 $\mu$m.

6. A dispersion-managed optical fiber according to claim 5, wherein the signal wavelength band is 1.54 $\mu$m–1.56 $\mu$m.

7. A dispersion-managed optical fiber according to claim 1, wherein each of said first portions has the chromatic dispersion of not less than +1 ps/nm/km but not more than +10 ps/nm/km at the predetermined wavelength in the signal wavelength band, and wherein each of said second portions has the chromatic dispersion of not less than −10 ps/nm/km but not more than −1 ps/nm/km at the predetermined wavelength in the signal wavelength band.

8. A dispersion-managed optical fiber according to claim 1, wherein each of said first portions has a length of not less than 500 m but not more than 10 km, and wherein each of said second portions has a length of not less than 500 m but not more than 10 km.

9. A dispersion-managed optical fiber according to claim 1, wherein a cumulative length of transient portions, which are positioned between each of said first portions and each of said second portions adjacent to each other and which have a chromatic dispersion whose absolute value is less than 1 ps/nm/km at the predetermined wavelength in the signal wavelength band, is set to not more than 10% of a total length of said dispersion-managed optical fiber.

10. A dispersion-managed optical fiber according to claim 1, wherein, at the predetermined wavelength in the signal wavelength band, an absolute value of a mean chromatic dispersion from a viewpoint of said whole dispersion-managed optical fiber is set to not more than 3 ps/nm/km.

11. A dispersion-managed optical fiber according to claim 1, wherein, at the predetermined wavelength in the signal wavelength band, a mean chromatic dispersion from a viewpoint of said whole dispersion-managed optical fiber is substantially zero.

12. A dispersion-managed optical fiber according to claim 1, wherein, each of said first portions has a positive dispersion slope at the predetermined wavelength in the signal wavelength band, and wherein each of said second portions has a negative dispersion slope at the predetermined wavelength in the signal wavelength band.

13. A dispersion-managed optical fiber according to claim 1, wherein said dispersion-managed optical fiber has an effective area of not less than 40 $\mu m^2$ at the predetermined wavelength in the signal wavelength band.

14. A dispersion-managed optical fiber according to claim 1, wherein said dispersion-managed optical fiber has a polarization mode dispersion of not more than 0.2 ps·km$^{-\frac{1}{2}}$ at the predetermined wavelength in the signal wavelength band.

15. A dispersion-managed optical fiber according to claim 1, wherein said dispersion-managed optical fiber comprises a core region including a layer of pure silica glass and extending along a predetermined axis, and a cladding region provided around an outer periphery of said core region.

16. A dispersion-managed optical fiber according to claim 15, wherein said core region comprises a first core doped with $GeO_2$ and having a relative refractive index difference of not less than 0.4% with respect to a reference region in said cladding region, a second core provided so as to surround said first core and doped with F element, said second core having a refractive index lower than that of pure silica glass, and a third core of pure silica glass provided so as to surround said second core, and wherein said cladding region includes a glass layer provided so as to surround said third core and doped with F element, said glass layer having a refractive index lower than that of pure silica glass.

17. A dispersion-managed optical fiber according to claim 16, wherein said first core has an outer diameter of not less than 4 $\mu$m but not more than 9 $\mu$m and has the relative refractive index difference of not less than 0.4% but not more than 1.1% with respect to the reference region in said cladding region, wherein said second core has an outer diameter of not less than 6 $\mu$m but not more than 20 $\mu$m and has a relative refractive index difference of not less than 0% but not more than 0.1% with respect to the reference region in said cladding region, and wherein said third core has an outer diameter of not less than 10 $\mu$m but not more than 30 $\mu$m and has a relative refractive index difference of not less than 0.05% but not more than 0.5% with respect to the reference region in said cladding region.

18. A dispersion-managed optical fiber according to claim 16, wherein said second core has the refractive index lower than that of the reference region in said cladding region.

19. A dispersion-managed optical fiber according to claim 18, wherein said first core has an outer diameter of not less than 4 μm but not more than 9 μm and has the relative refractive index difference of not less than 0.4% but not more than 1.1% with respect to the reference region in said cladding region,
wherein said second core has an outer diameter of not less than 6 μm but not more than 20 μm and has a relative refractive index difference of not less than −0.6% but less than 0% with respect to the reference region in said cladding region, and
wherein said third core has an outer diameter of not less than 10 μm but not more than 30 μm and has a relative refractive index difference of not less than 0.05% but not more than 0.5% with respect to the reference region in said cladding region.

20. A dispersion-managed optical fiber according to claim 15, wherein said core region includes a first core doped with $GeO_2$ and having a relative refractive index difference of not less than 0.7% with respect to a reference region in said cladding region, and a second core of pure silica glass provided so as to surround said first core, and
wherein said cladding region includes a glass layer provided so as to surround said second core and doped with F element, said glass layer having a refractive index lower than that of pure silica glass.

21. A dispersion-managed optical fiber according to claim 20, wherein said first core has an outer diameter of not less than 3 μm but not more than 6 μm and has the relative refractive index difference of not less than 0.7% but not more than 1.2% with respect to the reference region in said cladding region, and
wherein said second core has an outer diameter of not less than 15 μm but not more than 25 μm and has a relative refractive index difference of not less than 0% but less than 0.3% with respect to the reference region in said cladding region.

22. A dispersion-managed optical fiber according to claim 15, wherein said core region is comprised of pure silica glass, and
wherein said cladding region comprises an inner cladding provided so as to surround said core region and doped with F element, and an outer cladding provided so as to surround said inner cladding and doped with F element, said outer cladding having a refractive index higher than that of said-inner cladding.

23. A dispersion-managed optical fiber according to claim 16, wherein said cladding region comprises an inner cladding provided so as to surround said core region and doped with F element, and an outer cladding provided so as to surround said inner cladding and doped with F element, said outer cladding having a refractive index higher than that of said inner cladding.

24. A dispersion-managed optical fiber according to claim 22, wherein said core region has an outer diameter of not less than 3 μm but not more than 7 μm and has a relative refractive index difference of not less than 0.4% but not more than 0.9% with respect to said outer cladding, and
wherein said inner cladding has an outer diameter of not less than 7 μm but not more than 14 μm and has a relative refractive index difference of not less than −0.6% but less than 0% with respect to said outer cladding.

25. A dispersion-managed optical fiber according to claim 22, wherein said inner cladding has an outer diameter of not less than 25 μm but not more than 60 μm and has a relative refractive index difference of not less than −0.4% but less than 0% with respect to said outer cladding.

26. A dispersion-managed optical fiber according to claim 1, wherein an outer diameter of said dispersion-managed optical fiber is changed in synchronous with the change of a refractive index of said glass layer not doped with $GeO_2$, out of said plurality of glass layers, along the longitudinal direction of said dispersion-managed optical fiber.

27. An optical fiber preform for manufacturing a dispersion-managed optical fiber according to claim 1, wherein, out of regions respectively corresponding to said plurality of glass layers, a dopant concentration of a region containing a dopant for adjustment of refractive index is made uniform such that a maximum change of the dopant concentration is not more than 20%–30% along a longitudinal direction of said optical fiber preform.

28. A method of manufacturing a dispersion-managed optical fiber ensuring its single mode at a predetermined wavelength within a signal wavelength band, in which one or more first portions having a positive chromatic dispersion at the predetermined wavelength and one or more second portions having a negative chromatic dispersion at the predetermined wavelength are arranged alternately and adjacent to each other, said dispersion-managed optical fiber comprising a plurality of glass layers sequentially provided in a radial direction,
wherein a dopant concentration of a glass layer doped with a dopant for adjustment of refractive index, out of said plurality of glass layers, is made uniform such that a maximum change of dopant concentration along a longitudinal direction of said dispersion-managed optical fiber is suppressed to not more than 20–30%, and
wherein, a refractive index of a glass layer not substantially contained with $GeO_2$ as the dopant, out of said plurality of glass layers, is changed along the longitudinal direction of said dispersion-managed optical fiber, said method comprising the steps of:
preparing an optical fiber preform wherein, out of regions respectively corresponding to said plurality of glass layers, a dopant concentration of a region containing a dopant for adjustment of refractive index is made uniform such that a maximum change of the dopant concentration is not more than 20%–30% along a longitudinal direction of said optical fiber preform; and
drawing said prepared optical fiber preform while changing a drawing tension every a predetermined time interval.

29. A manufacturing method according to claim 28, wherein the drawing tension applied to said optical fiber preform is adjusted by changing a temperature of a molten portion of said optical fiber preform.

30. A manufacturing method according to claim 28, wherein the drawing tension applied to said optical fiber preform is adjusted by changing a drawing speed.

31. A manufacturing method according to claim 28, wherein a drawing speed at the time of drawing said optical fiber preform is changed in synchronous with a temperature change of a molten portion of said optical fiber preform.

32. An optical fiber preform for manufacturing a dispersion-managed optical fiber according to claim 1, wherein, out of regions respectively corresponding to said plurality of glass layers, a relative refractive index difference of each region containing a dopant for adjustment of refractive index with respect to pure silica glass is made uniform such that a maximum change of the relative refractive index difference is not more than 20%–30% along a longitudinal direction of said optical fiber preform.

33. A method of manufacturing a dispersion-managed optical fiber ensuring its single mode at a predetermined wavelength within a signal wavelength band, in which one or more first portions having a positive chromatic dispersion at the predetermined wavelength and one or more second portions having a negative chromatic dispersion at the predetermined wavelength are arranged alternately and adjacent to each other, said dispersion-managed optical fiber comprising a plurality of glass layers sequentially provided in a radial direction,
  wherein a dopant concentration of a glass layer doped with a dopant for adjustment of refractive index, out of said plurality of glass layers, is made uniform such that a maximum change of dopant concentration along a longitudinal direction of said dispersion-managed optical fiber is suppressed to not more than 20–30%, and
  wherein, a refractive index of a glass layer not substantially contained with $GeO_2$ as the dopant, out of said plurality of glass layers, is changed along the longitudinal direction of said dispersion-managed optical fiber, said method comprising the steps of:
    preparing an optical fiber preform wherein, out of regions respectively corresponding to said plurality of glass layers, a relative refractive index difference of each region containing a dopant for adjustment of refractive index with respect to pure silica glass is made uniform such that a maximum change of the relative refractive index difference is not more than 20%–30% along a longitudinal direction of said optical fiber preform; and
    drawing said prepared optical fiber preform while changing a drawing tension every a predetermined time interval.

34. A manufacturing method according to claim 33, wherein the drawing tension applied to said optical fiber preform is adjusted by changing a temperature of a molten portion of said optical fiber preform.

35. A manufacturing method according to claim 33, wherein the drawing tension applied to said optical fiber preform is adjusted by changing a drawing speed.

36. A manufacturing method according to claim 33, wherein a drawing speed at the time of drawing said optical fiber preform is changed in synchronous with a temperature change of a molten portion of said optical fiber preform.

37. An optical communication system in which a dispersion-managed optical fiber according to claim 1 constitutes at least a part of an optical transmission line installed in a repeater spacing.

38. An optical communication system according to claim 37, wherein said dispersion-managed optical fiber is arranged at an upstream side in the repeater spacing as seen from a traveling direction of signals each having a wavelength within the signal wavelength band.

39. An optical communication system according to claim 37, wherein an absolute value of a mean chromatic dispersion as seen from the whole repeater spacing is not more than 3 ps/nm/km at the predetermined wavelength in the signal wavelength band.

40. An optical communication system according to claim 37, wherein a mean chromatic dispersion as seen from the whole repeater spacing is substantially zero at the predetermined wavelength in the signal wavelength band.

41. An optical communication system according to claim 37, wherein a mean chromatic dispersion as seen from the whole repeater spacing is not less than 0.1 ps/nm/km but not more than 1.0 ps/nm/km at the predetermined wavelength in the signal wavelength band.

42. A dispersion-managed optical fiber ensuring its single mode at a predetermined wavelength within a signal wavelength band, in which one or more first portions having a positive chromatic dispersion at the predetermined wavelength and one or more second portions having a negative chromatic dispersion at the predetermined wavelength are arranged alternately and adjacent to each other, said dispersion-managed optical fiber comprising a plurality of glass layers sequentially provided in a radial direction,
  wherein a dopant concentration of a glass layer doped with a dopant for adjustment of refractive index, out of said plurality of glass layers, is made uniform such that a maximum change of the dopant concentration along a longitudinal direction of said dispersion-managed optical fiber is suppressed to not more than 20–30%, and
  wherein stresses remaining in said plurality of glass layers are changed along the longitudinal direction of said dispersion-managed optical fiber.

43. A dispersion-managed optical fiber according to claim 42, wherein, out of said plurality of glass layers, the dopant concentration of said glass layer doped with the dopant for adjustment of refractive index is made uniform such that the maximum change of the dopant concentration along the longitudinal direction of said dispersion-managed optical fiber is suppressed to not more than 10%.

44. A dispersion-managed optical fiber according to claim 42, wherein, out of said plurality of glass layers, a glass layer not substantially contained with $GeO_2$ as a dopant includes a layer of pure silica glass.

45. A dispersion-managed optical fiber according to claim 42, wherein a relative refractive index difference of a glass layer not substantially contained with $GeO_2$ as a dopant, out of said plurality of glass layers, with respect to pure silica glass is adjusted such that the relative refractive index difference of said glass layer becomes lower than that of a glass non-intentionally doped with $GeO_0$ having an amount equal to an amount of $GeO_2$ in said glass layer with respect to pure silica glass.

46. A dispersion-managed optical fiber according to claim 42, wherein the signal wavelength band is 1.53 μm–1.60 μm.

47. A dispersion-managed optical fiber according to claim 46, wherein the signal wavelength band is 1.54 μm–1.56 μm.

48. A dispersion-managed optical fiber according to claim 42, wherein each of said first portions has the chromatic dispersion of not less than +1 ps/nm/km but not more than +10 ps/nm/km at the predetermined wavelength in the signal wavelength band, and
  wherein each of said second portions has the chromatic dispersion of not less than −10 ps/nm/km but not more than −1 ps/nm/km at the predetermined wavelength in the signal wavelength band.

49. A dispersion-managed optical fiber according to claim 42, wherein each of said first portions has a length of not less than 500 m but not more than 10 km, and
  wherein each of said second portions has a length of not less than 500 m but not more than 10 km.

50. A dispersion-managed optical fiber according to claim 42, wherein a cumulative length of transient portions, which are positioned between each of said first portions and each of said second portions adjacent to each other and which have a chromatic dispersion whose absolute value is less than 1 ps/nm/km at the predetermined wavelength in the signal wavelength band, is set to not more than 10% of a total length of said dispersion-managed optical fiber.

51. A dispersion-managed optical fiber according to claim 42, wherein, at the predetermined wavelength in the signal wavelength band, an absolute value of a mean chromatic dispersion from a viewpoint of said whole dispersion-managed optical fiber is set to not more than 3 ps/nm/km.

52. A dispersion-managed optical fiber according to claim 42, wherein, at the predetermined wavelength in the signal wavelength band, a mean chromatic dispersion from a viewpoint of said whole dispersion-managed optical fiber is substantially zero.

53. A dispersion-managed optical fiber according to claim 42, wherein each of said first portions has a positive dispersion slope at the predetermined wavelength in the signal wavelength band, and
wherein each of said second portions has a negative dispersion slope at the predetermined wavelength in the signal wavelength band.

54. A dispersion-managed optical fiber according to claim 42, wherein said dispersion-managed optical fiber has an effective area of not less than 40 $\mu m^2$ at the predetermined wavelength in the signal wavelength band.

55. A dispersion-managed optical fiber according to claim 42, wherein said dispersion-managed optical fiber has a polarization mode dispersion of not more than 0.2 ps·km$^{-\frac{1}{2}}$ at the predetermined wavelength in the signal wavelength band.

56. A dispersion-managed optical fiber according to claim 42, wherein said dispersion-managed optical fiber has a core region including a layer of pure silica glass and extending along a predetermined axis and a cladding region provided around an outer periphery of said core region.

57. A dispersion-managed optical fiber according to claim 56, wherein said core region comprises a first core doped with GeO$_2$ and having a relative refractive index difference of not less than 0.4% with respect to a reference region in said cladding region, a second core provided so as to surround said first core and doped with F element, said second core having a refractive index lower than that of pure silica glass, and a third core of pure silica glass provided so as to surround said second core, and
wherein said cladding region includes a glass layer provided so as to surround said third core and doped with F element, said glass layer region having a refractive index lower than that of pure silica glass.

58. A dispersion-managed optical fiber according to claim 57, wherein said first core has an outer diameter of not less than 4 $\mu$m but not more than 9 $\mu$m and has the relative refractive index difference of not less than 0.4% but not more than 1.1% with respect to a reference region in said cladding region,
wherein said second core has an outer diameter of not less than 6 $\mu$m but not more than 20 $\mu$m and has a relative refractive index difference of not less than 0% but not more than 0.1% with respect to the reference region in said cladding region, and
wherein said third core has an outer diameter of not less than 10 $\mu$m but not more than 30 $\mu$m and has a relative refractive index difference of not less than 0.05% but not more than 0.5% with respect to the reference region in said cladding region.

59. A dispersion-managed optical fiber according to claim 57, wherein said second core has the refractive index lower than that of the reference region in said cladding region.

60. A dispersion-managed optical fiber according to claim 59, wherein said first core has an outer diameter of not less than 4 $\mu$m but not more than 9 $\mu$m and has the relative refractive index difference of not less than 0.4% but not more than 1.1% with respect to the reference region in said cladding region,
wherein said second core has an outer diameter of not less than 6 $\mu$m but not more than 20 $\mu$m and has a relative refractive index difference of not less than −0.6% but less than 0% with respect to the reference region in said cladding region, and
wherein said third core has an outer diameter of not less than 10 $\mu$m but not more than 30 $\mu$m and has a relative refractive index difference of not less than 0.05% but not more than 0.5% with respect to the reference region in said cladding region.

61. A dispersion-managed optical fiber according to claim 56, wherein said core region comprises a first core doped with GeO$_2$ and having a relative refractive index difference of not less than 0.7% with respect to a reference region in said cladding region, and a second core of pure silica glass provided so as to surround said first core, and
wherein said cladding region includes a glass layer provided so as to surround said second core layer and doped with F element, said glass layer having a refractive index lower than that of pure silica glass.

62. A dispersion-managed optical fiber according to claim 61, wherein said first core has an outer diameter of not less than 3 $\mu$m but not more than 6 $\mu$m and has the relative refractive index difference of not less than 0.7% but not more than 1.2% with respect to the reference region in said cladding region, and
wherein said second core has an outer diameter of not less than 15 $\mu$m but not more than 25 $\mu$m and has a relative refractive index difference of more than 0% but not more than 0.3% with respect to said cladding region.

63. A dispersion-managed optical fiber according to claim 56, wherein said core region is comprised of pure silica glass, and
wherein said cladding region comprises an inner cladding provided so as to surround said core region and doped with F element, and an outer cladding provided so as to surround said inner cladding and doped with F element, said outer cladding having a refractive index higher than that of said inner cladding layer.

64. A dispersion-managed optical fiber according to claim 47, wherein said cladding region comprises an inner cladding provided so as to surround said core region and doped with F element, and an outer cladding provided so as to surround said inner cladding and doped with F element, said outer cladding having a refractive index higher than that of said inner cladding layer.

65. A dispersion-managed optical fiber according to claim 63, wherein said core region has an outer diameter of not less than 3 $\mu$m but not more than 7 $\mu$m and has the relative refractive index difference of not less than 0.4% but not more than 0.9% with respect to said outer cladding, and
wherein said inner cladding has an outer diameter of not less than 7 $\mu$m but not more than 14 $\mu$m and has a relative refractive index difference of not less than −0.6% but less than 0% with respect to said outer cladding.

66. A dispersion-managed optical fiber according to claim 63, wherein said inner cladding has an outer diameter of not less than 25 $\mu$m but not more than 60 $\mu$m and has a relative refractive index difference of not less than −0.4% but less than 0% with respect to said outer cladding.

67. A dispersion-managed optical fiber according to claim 42, wherein an outer diameter of said dispersion-managed optical fiber is changed in synchronous with the change of stresses remaining in said plurality of glass layers along the longitudinal direction of said dispersion-managed optical fiber.

68. An optical fiber preform for manufacturing the dispersion-managed optical fiber according to claim 42, wherein, out of regions respectively corresponding said plurality of glass layers, a dopant concentration of a region containing a dopant for adjustment of refractive index is made uniform such that a maximum change of the dopant concentration is not more than 20%–30% along a longitudinal direction of said optical fiber preform.

69. A method of manufacturing the dispersion-managed optical fiber ensuring its single mode at a predetermined wavelength within a signal wavelength band, in which one or more first portions having a positive chromatic dispersion at the predetermined wavelength and one or more second portions having a negative chromatic dispersion at the predetermined wavelength are arranged alternately and adjacent to each other, said dispersion-managed optical fiber comprising a plurality of glass layers sequentially provided in a radial direction, wherein a dopant concentration of a glass layer doped with a dopant for adjustment of refractive index, out of said plurality of glass layers, is made uniform such that a maximum change of the dopant concentration along a longitudinal direction of said dispersion-managed optical fiber is suppressed to not more than 20–30%, and wherein stresses remaining in said plurality of glass layers are changed along the longitudinal direction of said dispersion-managed optical fiber, said method comprising the steps of:

preparing an optical fiber preform wherein, out of regions respectively corresponding said plurality of glass layers, a dopant concentration of a region containing a dopant for adjustment of refractive index is made uniform such that a maximum change of the dopant concentration is not more than 20%–30% along a longitudinal direction of said, optical fiber preform and drawing said prepared optical fiber preform by changing a drawing tension every a predetermined time interval.

70. A manufacturing method according to claim 69, wherein the drawing tension applied to said optical fiber preform is adjusted by changing a temperature of a molten portion of said optical fiber preform.

71. A manufacturing method according to claim 69, wherein the drawing tension applied to said optical fiber preform is adjusted by changing a drawing speed.

72. A manufacturing method according to claim 69, wherein a drawing speed at the time of drawing said optical fiber preform is changed in synchronous with a temperature change of a molten portion of said optical fiber preform.

73. An optical communication system in which an dispersion-managed optical fiber according to claim 42 constitutes at least a part of an optical transmission line installed in a repeater spacing.

74. An optical communication system according to claim 73, wherein said dispersion-managed optical fiber is arranged at an upstream side in the repeater spacing as seen from a traveling-direction of signals each having a wavelength within a signal wavelength band.

75. An optical communication system according to claim 73, wherein an absolute value of a mean chromatic dispersion as seen from the whole repeater spacing is not more than 3 ps/nm/km at a predetermined wavelength in a signal wavelength band.

76. An optical communication system according to claim 73, wherein a mean chromatic dispersion as seen from the whole repeater spacing is substantially zero at the predetermined wavelength in the signal wavelength band.

77. An optical communication system according to claim 73, wherein a mean chromatic dispersion as seen from the whole repeater spacing is not less than 0.1 ps/nm/km but not more than 1.0 ps/nm/km at the predetermined wavelength in the signal wavelength band.

* * * * *